US011762528B1

(12) United States Patent
Duneja et al.

(10) Patent No.: US 11,762,528 B1
(45) Date of Patent: *Sep. 19, 2023

(54) MOBILE APPLICATION WITH DYNAMIC FEATURE SET

(71) Applicant: Wells Fargo Bank, N.A., San Francisco, CA (US)

(72) Inventors: Anshuman M. Duneja, Oakland, CA (US); Uma Meyyappan, Fremont, CA (US); Stanislav Roumiantsev, Albany, CA (US); Bipin M. Sahni, Pleasanton, CA (US); Jennifer Toby Whateley, Fremont, CA (US); Janelle Wolak, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,444

(22) Filed: Jan. 19, 2022

Related U.S. Application Data

(63) Continuation of application No. 16/224,625, filed on Dec. 18, 2018, now Pat. No. 11,237,698, which is a continuation of application No. 16/149,655, filed on Oct. 2, 2018, now Pat. No. 11,119,626.

(51) Int. Cl.
| | |
|---|---|
| *G06F 3/04817* | (2022.01) |
| *G06Q 20/32* | (2012.01) |
| *G06F 3/0484* | (2022.01) |
| *G06Q 20/14* | (2012.01) |
| *H04W 88/02* | (2009.01) |

(52) U.S. Cl.
CPC ........ *G06F 3/04817* (2013.01); *G06F 3/0484* (2013.01); *G06Q 20/14* (2013.01); *G06Q 20/3223* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 8,719,132 B1 * | 5/2014 | Diggdon | G06Q 20/00 705/38 |
| 11,237,698 B1 * | 2/2022 | Duneja | G06Q 20/3223 |
| 2007/0011099 A1 | 1/2007 | Sheehan | |
| 2011/0028138 A1 | 2/2011 | Davies-Moore et al. | |

(Continued)

*Primary Examiner* — Namrata Boveja
*Assistant Examiner* — Divesh Patel
(74) *Attorney, Agent, or Firm* — Foley & Lardner LLP

(57) ABSTRACT

A computing device may include a provider application and data defining perceptible elements that provide users with various functionalities in more easily consumable stages. The application may determine that the user is at a first level of sophistication based on user activities and/or circumstances, and present a first set of perceptible elements in response thereto to provide a first set of functionalities. The application may then determine the user is at a second, higher level of sophistication based on subsequent activities and/or circumstances, and present a second set of perceptible elements to provide a second set of functionalities that includes at least one new functionality not provided via the first set of perceptible elements. Applications can be less resource intensive by evolving to strategically tailor available functionality to the circumstances and needs of particular users.

20 Claims, 20 Drawing Sheets

(56) References Cited

U.S. PATENT DOCUMENTS

| | | |
|---|---|---|
| 2014/0012745 A1 | 1/2014 | Hanson et al. |
| 2014/0129303 A1* | 5/2014 | Aiglstorfer ........ G06Q 30/0241 |
| | | 705/35 |
| 2017/0076398 A1 | 3/2017 | Clark et al. |
| 2017/0255455 A1 | 9/2017 | Collier et al. |
| 2019/0259057 A1* | 8/2019 | Kapadia ............ G06Q 30/0251 |
| 2020/0104935 A1 | 4/2020 | Schmitt et al. |

* cited by examiner

MOBILE APPLICATION WITH DYNAMIC FEATURE SET

CROSS REFERENCE TO RELATED APPLICATIONS

This application is a continuation of U.S. patent application Ser. No. 16/224,625 filed Dec. 18, 2018, entitled "Mobile Application With Dynamic Feature Set Based On User Sophistication, which is a continuation of U.S. patent application Ser. No. 16/149,655 entitled "Mobile Application With Dynamic Feature Set Based On User Sophistication," filed Oct. 2, 2018, all of which are incorporated herein by reference in their entireties.

TECHNICAL FIELD

The present disclosure relates generally to systems and methods for tailoring user experiences based on user circumstances, needs, and/or knowledge, and more specifically to providing content and functionality based on the evolving level of sophistication of the user via one or more client applications with varying feature sets.

BACKGROUND

Conventional software application development involves creating applications that make the same functionality available to all users. For example, a traditional banking application may allow a user to access his or her checking account balance, request that a check be mailed to a specified payee, request a service, etc., but the application does not vary the functionality provided. Two very different users would experience the same functionality, even though they may have very different backgrounds, circumstances, knowledge bases, and needs. Moreover, an individual user would experience the same functionality over time even though his or her circumstances, knowledge base, and needs change. In some situations, if such an application is not well-suited to some users, this may lead to users no longer using the application, which may result in lost opportunities for the entity providing the application as well as the user. In others situations, this may lead to users making relatively poor decisions based on too much or too little information, or otherwise on information that is not well aligned with the user's needs and circumstances.

Applications that provide too much information and functionality may be unnecessarily resource-intensive, tending to require more computing power, memory, software instructions, etc., than would otherwise be required. For example, an application designed to provide all the functionality that may be desired by all users will tend to be larger and more complex than necessary for many other users, requiring more storage, processing power, etc., from the user computing devices of those other users. Increased functionality may also more often require access to and use of confidential, personal, or otherwise sensitive information. For example, an application (such as a banking application) that provides more functionality may need to retrieve, display, process, and/or transmit more personal or financial information of the user to provide the functionality. This tends to require additional time and resources for heightened security measures to protect the sensitive information, such as more frequent and more stringent authentication and authorization protocols, shorter time-out periods (requiring users to, e.g., "log in" more often following inactivity), etc. When not needed, such information and functionality may thus unnecessarily increase the need for certain resource-intensive security protocols.

SUMMARY

One embodiment of the disclosure relates to a mobile computing device. The mobile computing device may comprise a network circuit configured to communicate data with a provider computing system of a provider via a network. The mobile computing device may also comprise a memory having stored thereon a provider application retrieved via the provider computing system or via a digital application distribution platform. The memory may also have stored thereon data defining perceptible elements presented via the provider application. The perceptible elements may provide a user with one or more functionalities. The provider application may be configured to use the network circuit to communicate with the provider computing system to access account data corresponding to an account of the user. The provider application may be configured to determine that the user is at a first level of sophistication based at least in part on a first series of user activities. The provider application may be configured to present a first set of perceptible elements in response to the determination that the user is at the first level of sophistication, the first set of perceptible elements providing the user with a first set of functionalities. The provider application may be configured to determine that the user is at a second level of sophistication based at least in part on a second series of user activities, the second series of user activities occurring after the determination that the user is at the first level of sophistication. The provider application may be configured to present a second set of perceptible elements in response to the determination that the user is at the second level of sophistication, the second set of perceptible elements providing the user with a second set of functionalities that includes a new functionality not included in the first set of perceptible elements.

Another embodiment relates to a method. The method may comprise using a network circuit to access account data corresponding to an account of a user of a mobile computing device, the account data being stored at a provider computing system. The method may comprise determining that the user is at a first level of sophistication based at least in part on a first series of user activities identified by at least one of the mobile computing device and the provider computing system. The method may comprise determining that the user is at a second level of sophistication based at least in part on a second series of user activities identified by at least one of the mobile computing device and the provider computing system, the second series of user activities occurring after the determination that the user is at the first level of sophistication. The method may comprise detecting a signal generated by the mobile computing device in response to the user indicating a desire to be presented with available functionalities. The method may comprise presenting a first set of perceptible elements via an output device of the mobile computing device in response to detecting the signal when the user is determined to be at the first level of sophistication, the first set of perceptible elements providing the user with a first set of functionalities. The method may comprise presenting a second set of perceptible elements via the output device of the mobile computing device in response to detecting the signal when the user is determined to be at the second level of sophistication, the second set of perceptible elements providing the user with a second set of functionalities that includes a new functionality not included in the first set of functionalities.

Another embodiment relates to a provider computing system associated with a provider. The provider computing system may comprise a first network circuit configured to communicate data via a network. The provider computing system may also comprise a processor configured to use the first network circuit to transmit an application to at least one of a digital application distribution platform and a mobile computing device of a user. The application may have data defining visually perceptible elements providing one or more functionalities via the mobile computing device. The application may be configured to cause the mobile computing device to use a second network circuit of the mobile computing device to communicate with the provider computing system to access account data corresponding to a financial account of the user. The application may be configured to cause the mobile computing device to determine that the user is at a first level of sophistication based at least in part on a first series of funds transfers involving the financial account of the user. The application may be configured to cause the mobile computing device to present a first set of visually perceptible elements in response to the determination that the user is at the first level of sophistication, the first set of visually perceptible elements providing the user with a first functionality. The application may be configured to cause the mobile computing device to determine that the user is at a second level of sophistication based at least in part on a second series of funds transfers involving the financial account of the user, the second series of funds transfers occurring after at least one of the first series of funds transfers and the determination that the user is at the first level of sophistication. The application may be configured to cause the mobile computing device to present a second set of visually perceptible elements in response to the determination that the user is at the second level of sophistication, the second set of visually perceptible elements providing the user with a second functionality not provided by the first set of elements.

DETAILED DESCRIPTION

Figure 1:
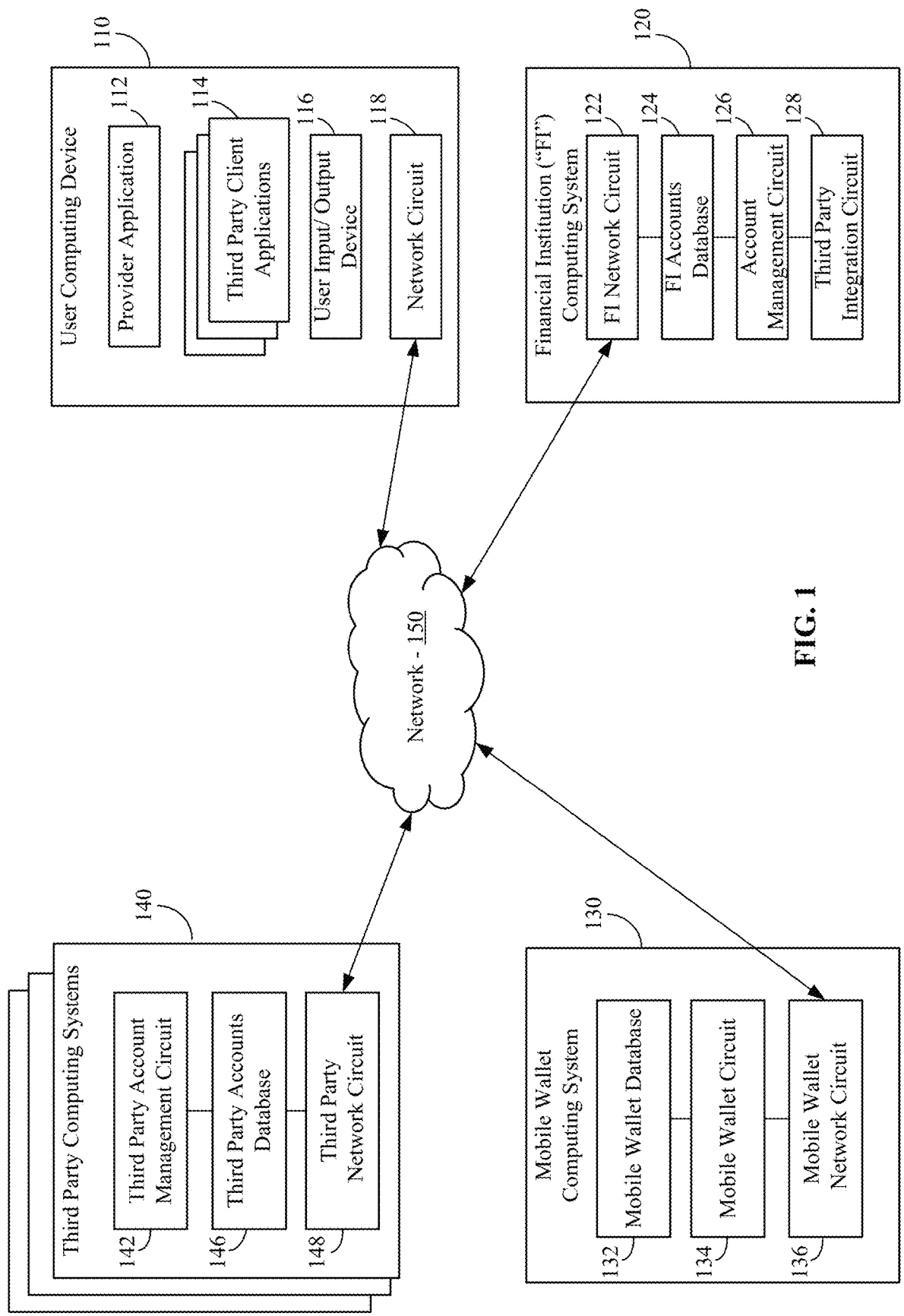
FIG. 1 is a block diagram of a computer-implemented system for providing a dynamic user experience, according to example embodiments.

Various embodiments described herein relate to systems and methods for providing users with one or more mobile applications that provide evolving content and functionality tailored for different users. The content and functionality may be based on the user's changing level of sophistication. Sophistication may refer to how savvy the user is with respect to the subject matter of the mobile application. Sophistication may refer to experience level, such as a number of completed transactions, types of transactions completed, etc. Sophistication may additionally or alternatively correspond to the level of responsibility undertaken by the user, such as the amount of resources (financial, human, or otherwise) being managed, the number of inflows and outflows (e.g., the number of sources of income and/or the number or frequency of payments made to third parties), the user's role or title in an organization, etc.

In various embodiments, the sophistication of a user is determined by one or more components of the system based on observations rather than on a selection by the user as to what level of sophistication the user considers himself/ herself to be. Sophistication may be determined based on the user's activities and behaviors as identified via the mobile application (e.g., based on what data the user accesses via the mobile application, such as advanced investor options as opposed to simple account balances, and/or based on other interactions of the user with the mobile application), and/or as identified independently of the mobile application. A mobile banking application, for example, presents users with the type and amount of information, recommendations, products, and/or functionality that is helpful but not overwhelming for the user. As the user becomes more financially savvy and/or more capable of managing his or her finances, and/or as the user takes on more responsibility for his or her finances, the mobile application adapts to meet the evolving needs of the user. The mobile application may recognize multiple levels of sophistication and provide a different user experience with different features at each level. The applications and user experiences may differ, for example, by presenting forward-looking information over different time horizons, by presenting recommendations for different financial and non-financial products that are more suited to the user based on her or her life circumstances, by providing different information over time that is more relevant to the user so as to allow the user to acclimate to growing responsibilities and learn how to better manage his or her finances, and so forth.

Advantageously, by making the functionality available only after it is determined that the user has achieved a higher level of sophistication, the provider application is not as resource intensive. For example, a "smaller" provider application (i.e., one requiring less memory because unused functionalities are not included) saves space on the user computing device. Often, users of mobile devices such as smartphones and tablets are forced to choose between the applications, music, movies, videos, pictures, audio recordings, etc., stored on the mobile devices. A larger application means the user has less space available for other applications and media. With a smaller provider application, the user computing device does not need to allocate as much resources for functionality that is unneeded (because of, e.g., the user's unique circumstances), unused (because, e.g., the user does not have the requisite knowledge), and/or unhelpful (because, e.g., the functionality would overwhelm the user). Larger, more complex versions of an application can be reserved for more sophisticated users.

Additionally, relative to applications with less functionality, applications with more functionality may demand more processing or other computing resources from the user computing device on which it is run, even if the additional functionality is not used by the user. For example, an unused functionality of an application may perform certain background operations (e.g., so as to be ready to provide the user with certain content or functions upon demand), such as tracking the location of the user computing device using a GPS or other locating device, transmitting data to or receiving data from other devices (e.g., remote servers or nearby devices), or other actions. Additionally, creating, maintaining, and updating an application with unneeded functionality tends to unnecessarily complicate the software development process, requiring more time and resources from the provider of the application. Features can be activated or unlocked on an as-needed basis.

Further, a feature or capability may be provided by a software application with different levels of robustness, with more robust features and capabilities tending to require more computing resources. For example, a calendar feature may require significantly more resources if the calendar extends to a month or a year as opposed to a week or a day because the longer calendar may require accessing more information relevant to more days, a more robust graphical user interface, etc. Even though more robust features can be useful, they may also be unnecessary and/or unhelpful, as they may overwhelm a user or otherwise fail to meet the needs of the user or align with his or her goals. Tailoring a user experience by providing more suitable functionality thus can serve the user better while reducing the demands by the software application on computing resources.

The routine, conventional approaches pose unique technological challenges that are tackled by the disclosed technological solutions. For example, the traditional approach involves making the same features available to all users, and leaving it to each user to decide which functionality to use and which features to leave unused. Moreover, the routine, conventional approach is to provide one software application with all the functionality that is developed by the software developer, even though that may be unnecessarily resource intensive for a significant fraction of the user base. For example, applications conventionally demand as much computing resources as required for the "power user" (who may take advantage of most features of an application) even when being used by the "novice" (who may use fewer features of the application).

The technological solutions discussed herein are not routine or conventional. For example, it is unconventional to restrict or unlock features available to different users based on behaviors and circumstances of the user. It is also unconventional to provide different features based on factors that are independent of how the user interacts with the application (e.g., based on a user's account history). It is additionally unconventional to provide multiple applications with different features sets depending on the specific user and his or her level of sophistication. It is moreover unconventional to provide an application that only stores locally the features (e.g., the executable code corresponding with various functionality) that are determined to be relevant to a particular user based on his or her sophistication, and that retrieves additional features on an as-needed basis.

The disclosed systems, methods, and computer implementations may also provide funds transfer and request functionalities that improve current computing systems and payment systems by facilitating payments between parties via a reduced number of authenticated communications sessions or other security protocols. For example, conventionally, each time a user (who may be viewing his or her account information via a mobile banking application) wishes to send or receive funds electronically, the sender may use a separate application (such as a third-party mobile wallet application) which requires separate communications sessions or other authentication to initiate a funds transfer. If the user wishes to request funds from another individual, he or she tasks his or her computing device with running a separate communications application with its own security protocols, and the individual uses separate communications and mobile wallet or other banking application to make a transfer. By reducing the number of applications, security protocols, and communications sessions required for funds transfers between two entities, the clock time, processing time, programmatic instructions (e.g., for authenticating a user account) and other requirements of the central processing unit, memory utilization, and other system resources are reduced. Also, not needing to maintain and engage in as many authentication protocols enhances security and efficiency.

The disclosed systems, methods, and computer implementations moreover improve current computing systems and payment systems by reducing the number and complexity of security protocols associated with protecting the more sensitive information that may be accessed, displayed, processed, and/or transmitted in the implementation of undesirable, unhelpful, and/or unneeded features. If an application may potentially use more sensitive information in providing a functionality, even if the functionality is unused, the application will utilize the security protocols warranted by the more sensitive information because of the potential to use the more sensitive information. That is, an application may use security protocols that are as stringent as they need to be for the most sensitive information, even if the information is not needed because the information is only used by a feature that is not utilized by the user. More stringent security protocols tend to be more resource intensive for user computing devices as well as servers, and tend to require more time and effort by the user. Consequently, restricting, eliminating, and/or locking certain unneeded functionalities can allow for eased security protocols and thus a savings in computing resources and the time and effort otherwise expended by users.

The disclosed systems, methods, and computer implementations also improve current computing systems and payment systems by facilitating payment between two parties by forming a link between the parties without requiring the parties to exchange financial information about one another while still being able to transact with one another (via, e.g., a near-field communication transceiver). The clock time, processing time, programmatic instructions required to authenticate a user account, and other requirements of the central processing unit, memory utilization, and other system resources are reduced because a transaction between the parties is accomplished by only having access to only minimal data about the other party (e.g., a proximity of the other party) without requiring the provisioning of traditionally exchanged information needed to conduct payment transactions. Accordingly, system security is improved and payments are more quickly completed than current payment systems.

The disclosed graphical user interfaces (GUIs) displayed on user computing devices can improve the functioning of the user computing devices by presenting the user with fewer selectable, visually perceptible elements. In addition to reducing the computing resources required to present simpler GUIs, the disclosed approach improves the efficiency of using the electronic device. The improved user interfaces disclosed herein provide for specific manners of displaying limited sets of information to the user. This is particularly useful for devices with small screens, such as smartphones and other handheld mobile devices. Applications traditionally present users with a large number of functionalities that may require a user to scroll through multiple pages and switch views multiple times to locate desired functionality. Such a process may be cumbersome, and may require more time to learn. User computing devices are thus improved and made more efficient by presenting users with only the functionality that is determined to be suited to the user.

The GUI displayed on user computing devices can also present notifications to the respective user providing a summary of past and future transactions between parties. The notification can be provided in the form of an application summary reachable directly from a home screen of the mobile device or the application, or from a menu of the mobile device (e.g., by hovering over an application icon of a client application, by selecting the application icon without actually launching the application). The application summary may indicate a summary of the payment (e.g., an amount of the payment). By selecting the application summary, the client application may be launched and automatically navigated to a sub-screen providing additional and more specific details of the transaction (e.g., time of transaction, currency used, whether the payment is a repeat payment from a same prior payer). The application summary can provide a summary of more than one transactions (e.g., a list of payment amounts received organized by transaction time). Accordingly, the application summary may provide only limited data when the application is in an unlaunched state, when first launched, or via a home screen, and further details of each transaction can be accessed by selecting the corresponding transaction summary to automatically launch the application and/or to be automatically navigated to the corresponding sub-screen displaying additional and more specific details of the transaction, thereby providing an improved GUI for electronic devices, and particularly electronic mobile devices.

Referring now to FIG. 1, a block diagram of a computer-implemented system 100 for providing an evolving client application with a dynamic feature set is shown, according to an example embodiment. The system 100 includes a user computing device 110 associated with a user, a financial institution computing system 120 associated with a financial institution, a mobile wallet computing system 130 associated with a mobile wallet provider, and one or more third party computing systems 140 associated with various third parties. The various systems and devices may be communicatively and operatively coupled through a network 150, which may include one or more of the Internet, cellular network, Wi-Fi, Wi-Max, a proprietary banking network, or any other type of wired or wireless network or a combination of wired and wireless networks. As described herein, the system 100 may be used to provide client applications on the user computing device 110, such as client applications of the financial institution or of third-parties.

Third party computing systems 140 are computing systems associated with various third parties. As used herein with respect to third party computing systems 140, "third parties" refer to entities that provide various products or services, such as electronic (e.g., web or application-based) services. While conventionally these third parties provide their services independent of the financial institution, according to the present disclosure, the system 100 includes various features to facilitate the integration of the services provided via the third party computing systems 140 and those provided by the financial institution. The "services" or "products" may include, but are not limited to, sale and/or delivery of financial and non-financial goods and services, payment-related services such as online shopping, search engines, product review services, issuer-specific financial rewards, social media accounts, security services, broker services, and the like.

Each third party computing system 140 may include a third party account management circuit 142, a third party accounts database 146, and a third party network circuit 148 that enables the third party computing system 140 to exchange data, information, values, and the like over the network 150. The third party accounts database 146 is structured to retrievably store user information relating to user relationships with the third party, and may include non-transient data storage mediums (e.g., local disc or flash-based hard drives, local network servers, and the like) or remote data storage facilities (e.g., cloud servers). Third party account database 146 may include information pertaining to user accounts with the third party. The information stored in the third party account database 146 varies depending on the particular service provided by the third party computing system 140.

The third party account management circuit 142 is structured to provide the user with access to the third party computing system 140 to manage one or more of their accounts held by the third party. As will be appreciated, the functionalities performed by the third party account management circuit 142 will vary depending on the nature of the service provided at the third party computing system 140. In some embodiments, the third party account management circuit 142 is configured to provide an application (e.g., a third party client application 114) on various user computing devices 110. The application 114 may provide users with various displays enabling the users to take advantage of the various functionalities provided by the third party computing systems 140.

In various embodiments, the third party computing system 140 includes various software components such as various software development kits (SDKs) that facilitate, enable, or otherwise permit the third party to integrate various functionalities provided by the financial institution into services provided via the third party computing system 140. For example, in various embodiments, the financial institution associated with the financial institution computing system 120 provides access to an SDK to facilitate the development of applets providing users with access to functionalities accessible to the user via the financial institution computing system 120. Via the applets, such functionalities may be exposed via the services at the third party computing systems 140 to provide broad access to the financial institution's services. Each applet may be associated with a particular type of functionality (e.g., information) provided via the financial institution, and be associated with an API at the financial institution computing system 120 configured to facilitate the provisioning of the necessary information for accessing the functionality. As described herein, the user computing device 110 and/or the financial institution computing system 120 may selectively provide users of user computing device 110 with tailored content and functionality depending on the needs of the user.

The mobile wallet computing system 130 is structured to permit, enable, facilitate, manage, process, and otherwise allow mobile wallet transactions. As used herein, the term "mobile wallet transaction" refers to electronic transactions involving the user computing device 110 and the device or computing system of another entity (e.g., an individual, a merchant, a financial institution, or any other entity that is the source or recipient of funds). The mobile wallet computing system 130 may be associated with, owned by, and/or otherwise operated by a mobile wallet provider. In one embodiment, the mobile wallet provider may be a financial institution, such as the financial institution associated with the financial institution computing system 120. In this instance, the mobile wallet computing system 130 may be a part of the financial institution computing system 120. In another embodiment and as shown, the mobile wallet provider may be a third party provider relative to the financial institution that operates the financial institution computing system 120.

In any configuration, the mobile wallet computing system 130 may provide or at least partly provide a mobile wallet circuit 134. As described in more detail herein, the "mobile wallet" is a digital wallet provided on, for example, the user computing device 110. The digital wallet may include payment capabilities, such as the ability to use a communication protocol (e.g., near-field communication) at a point-of-sale terminal to transfer payment information and enable the purchase of a good or service. Additionally, the digital wallet may include many other capabilities, functions, and features that are described herein in more detail.

In arrangements where the mobile wallet provider is the financial institution associated with the financial institution computing system 120, each of the operations described herein with respect to the mobile wallet computing system 130 may also be described as being performed by the financial institution computing system 120. In such arrangements, the financial institution computing system 120 and the mobile wallet computing system 130 may be operated as a single computing system, or as two or more separate computing systems (as shown in FIG. 1) performing the associated functions described herein. As will be appreciated, the level of functionality that resides on the financial institution computing system 120 as opposed to the mobile wallet computing system 130 in these arrangements may vary depending on the implementation.

With the above in mind, the mobile wallet computing system 130 is shown to include a mobile wallet database 132, a mobile wallet circuit 134, and a mobile wallet network circuit 136 enabling the mobile wallet computing system 130 to exchange data over the network 150. The mobile wallet computing system 130 may be configured to exchange data with the user computing device 110, financial institution computing system 120, and third party computing systems 140 in the implementation of a user mobile wallet.

Mobile wallet database 132 is structured to store information regarding mobile wallet accounts held by various users, such as for a mobile wallet account held by the user of the user computing device 110. For instance, the mobile wallet database 132 may store various forms of information related to the user and/or an associated mobile device upon registration of one or both for a mobile wallet. The stored mobile wallet account information may include authentication information (e.g., username/password combinations, device authentication tokens, security question answers, etc.), payment card information (e.g., payment tokens), transaction histories, account holder identifying information, registered device information, and any other information that may be encountered in the operation of a mobile wallet account or otherwise referenced herein. Such information may include user preferences and other information comprising a user profile. In some arrangements, for example, mobile wallet database 132 also includes a token vault that is maintained by the mobile wallet computing system 130. The token vault may include a lookup table maintaining tokens associated with various user payment vehicles. The tokens stored therein may be generated internally (e.g., at the mobile wallet computing system 130) or by other entities (e.g., a token service provider computing system). For example, in one embodiment, the token vault may include a lookup table including tokens that that have been randomly assigned to a user payment vehicle (e.g., user checking accounts, credit/debit cards, and the like) by the mobile wallet computing system 120. In some arrangements, the mobile wallet computing system 130 may include an associated token management system (not shown) including one or more algorithms, processes, formulas, etc. that facilitate the efficient searching of the information stored in the token vault. For example, a mapping algorithm may be utilized to map Token-to-PAN information. Thus, when a token is received, the mapping algorithm determines the associated PAN and sends that information to the issuer.

The mobile wallet circuit 134 is structured to provide a mobile wallet on the user computing device 110. In some embodiments, the mobile wallet circuit 134 is structured to provide a mobile wallet client application on the user computing device 110. In this regard, the mobile wallet circuit 134 enables registrations of a user for a mobile wallet, presents the user with various user interfaces enabling users to use or manage a mobile wallet, and enables users to perform transactions using the mobile wallet (e.g., as described with respect to provider application 112 herein).

The financial institution computing system 120 is a computing system at a financial institution that provides and maintains one or more financial accounts (e.g., demand deposit account, credit or debit card account, brokerage account, mortgage account, etc.) on behalf of the user. In some arrangements, the financial institution is an issuer of a payment vehicle held by the user. The payment vehicle may be used as a source payment vehicle for transactions engaged in via the user's mobile wallet. In the context of the present disclosure, the financial institution can include commercial or private banks, credit unions, investment brokerages, mobile wallet providers, and so on, but can also include any commercial entity capable of maintaining payment vehicles on behalf of a user, including retailers, vendors, service providers, and the like. For example, in one embodiment, the financial institution can be a merchant implementing a loyalty card program including a loyalty card. The loyalty card may be provisioned to the user's mobile wallet such that the user may conduct mobile wallet transactions with the loyalty card. In some arrangements, the financial institution is also a mobile wallet provider configured to manage mobile wallet accounts on behalf of its customers (i.e., users), including authenticating mobile wallet transactions involving debits from the users' payment vehicles. For example, the financial institution may also operate the mobile wallet computing system 130 in various embodiments.

The financial institution computing system 120 includes a financial institution network circuit 122 enabling the financial institution computing system 120 to exchange data over the network 150, a financial institution accounts database 124, an account management circuit 126, and a third party integration circuit 128. The financial institution accounts database 124 is structured to retrievably store user information relating to the various operations discussed herein, and may include non-transient data storage mediums (e.g., local disc or flash-based hard drives, local network servers, and the like) or remote data storage facilities (e.g., cloud servers). The accounts database 124 may include personal information (e.g., names, addresses, phone numbers, and so on), authentication information (e.g., username/password combinations, device authentication tokens, security question answers, unique customer identifiers, biometric data, etc.), and financial information (e.g., token information, account numbers, account balances, available credit, credit history, transaction histories, and so on) relating to the various users and associated financial accounts.

The account management circuit 126 is structured to manage the financial accounts of various users, including maintaining and handling transaction processing for the user's one or more financial accounts. In some embodiments, the financial institution client application (herein "provider application") 112 is provided by the account management circuit 126. In this regard, the account management circuit 126 is configured to provide information, values, commands, and the like used to render various displays to aid the user in accessing the various functionalities described herein.

For example, in some embodiments, the account management circuit 126 is configured to receive various account management preferences from, for example, the user computing device 110. Some of such user preferences may include designations of "pre-authentication user information" or "PUI" pertaining to financial services prior to requiring the user to authenticate herself. As described herein, via the provider application 112, the user may specify various forms of information that the user wishes to be accessible prior to authentication via the provider application 112. Such information may include various identities of user accounts (e.g., actual account numbers, surrogate account numbers, account names, etc.), balances associated with the user accounts, transaction histories associated with the user accounts, and other information.

The provider application 112 may configure the user computing device 110 to request such information from the financial institution computing system 120 at various points in various data processing flows associated with functionalities provided via the provider application 112. For example, as described herein, a multi-feature GUI serving as a home screen of the provider application 112 may include balances of user accounts. As such, upon the user's initiation of the provider application 112 on the user computing device 110, the user computing device 110 may request balance information from the financial institution computing system 120. In response to the requests, the financial institution computing system 120 may cross-reference the requested information with the user's PUI designations and, if in accordance with the designations, grant the request by transmitting the information to the user computing device 110. Thus, the account management circuit 126 facilitates the user customizing data accessible via various data processing flows within the provider application 112 to facilitate streamlined access to various services.

The third party integration circuit 128 is configured to arbitrate or otherwise manage various information requests received from the third party computing systems 140 to facilitate the integration of the financial institution's services into those provided by third parties. In this regard, the third party integration circuit 128 may include a plurality of APIs that facilitate the sharing of varying types of information with different third parties. The information shared may depend on that which is necessary to integrate a particular financial institution functionality into a third party service. For example, if a particular third party (e.g., associated with a third party client application 114) wishes to integrate a mobile wallet provided via the financial institution into the third party client application 114, the third party integration circuit 128 may update access permissions associated with a wallet API to provide the third party with access to a user's wallet information. This may facilitate the third party integrating a wallet applet (e.g., via an associated applet developed through an SDK), into the third-party application, enabling the user to conduct mobile wallet transactions from within a third party client application 114. Other such examples (e.g., for P2P payments, account balance checks, bill payment information, transaction histories, etc.) are also envisioned.

The user computing device 110 is a computing device associated with the user. The user may include one or more individuals, business entities, government entities, and agents. The user computing device 110 is structured to exchange data over the network 150, execute software applications, access websites, generate GUIs, and perform other operations described herein. The user computing device 110 may include any sort of computing device, such as a smartphone, personal computer, a wearable computing device (e.g., eyewear, a watch or bracelet, etc.), a tablet, a portable gaming device, a laptop, and any other form of computing device (e.g., a smart appliance, a smart speaker, etc.).

The user computing device 110 includes a provider application 112, third party client applications 114, a user input/output ("I/O") device 116, and a network circuit 118 enabling the user computing device 110 to exchange information over the network 150. The user I/O device 116 includes hardware and associated logics configured to enable the user computing device 110 to exchange information with a user and other devices (e.g., a merchant transaction terminal). An input aspect of the user I/O device 116 allows the user to provide information to the user computing device 110, and may include, for example, a mechanical keyboard, a touchscreen, a microphone, a camera, a fingerprint scanner, any user input device engageable to the user computing device 110 via a USB, serial cable, Ethernet cable, and so on. An output aspect of the user I/O device 116 allows the user to receive information from the user computing device 110, and may include, for example, a digital display, a speaker, illuminating icons, LEDs, and so on. The user I/O device 116 may include systems, components, devices, and apparatuses that serve both input and output functions, allowing the financial institution computing system 120 exchange information with the user computing device 110. Such systems, components, devices and apparatuses include, for example, radio frequency transceivers (e.g., RF or NFC-based transceivers) and other short range wireless transceivers (e.g., Bluetooth®, laser-based data transmitters, etc.).

The provider application 112 may be structured to facilitate and permit conductance of transactions and management of accounts held by the user (e.g., at the financial institution associated with the financial institution computing system 120 and/or other financial institutions). Accordingly, in some arrangements, the provider application 112 is communicably coupled via the network circuit 118 over the network 150 to the financial institution computing system 120. In some embodiments, the provider application 112 includes a circuit embodied within the user computing device 110. For example, the provider application 112 may include program logic stored in a system memory of the user computing device 110. In such arrangements, the program logic may configure a processor of the user mobile device to perform at least some of the functions described herein with respect to the provider application 112. In some embodiments, the provider application 112 is a web-based application (e.g., provided via the financial institution computing system 120). As will be understood, the level of functionality that resides on the user computing device 110 versus the financial institution computing system 120 will vary depending on the implementation.

In some embodiments, the provider application 112 includes or is otherwise associated with a mobile wallet implemented on the user computing device 110. For example, the provider application 112 may include a mobile wallet circuit therein that facilitates communications via the user computing device 110 to the mobile wallet computing system 130 enabling access to a user mobile wallet. In such embodiments, the provider application 112 is structured to permit mobile wallet users to engage in transactions through the initiation of communications with, for example, a merchant point of sale ("POS") device. For example, in some embodiments, the provider application 112 includes a payment application facilitating exchange of mobile wallet credentials (e.g., tokenized account information) with the POS device. In this regard, the provider application 112 may interface with a near field communications ("NFC") chip controller to exchange the mobile wallet credentials.

It should be understood that the role that the provider application 112 takes in payment transactions will depend on the implementation of the mobile wallet. In some arrangements, for example, the mobile wallet is implemented in a secure element framework. In such arrangements, the user computing device 110 includes a secure element that is separate from the main system memory of the user computing device 110. The secure element refers to a tamper-resistant platform that hosts various applications and confidential information associated therewith. The secure element may include, but is not limited to, a universal subscriber identity circuit (a SIM card), a trusted execution environment, and/or a secure digital card. In such arrangements, user authentication information (e.g., payment account information, user PINS, and the like) is stored in the secure element. In various arrangements, the secure element of the user computing device 110 may include a payment application that interfaces with the NFC chip of the user device responsive to receiving a communication (e.g., an application protocol data unit) from the POS device to enable user payment information be transferred. In such arrangements, no user information is transferred by the provider application 112 to the NFC chip. After user payment information is transmitted to the POS device, the provider application 112 may query the secure element for transaction data to notify the user of the completed transaction.

In other arrangements, the provider application 112 may operate under a host card emulation framework. In such arrangements, user payment information is maintained within the provider application 112 or cloud-based environment (e.g., a host emulation service) rather than in the secure element. In this regard, the provider application 112 may include a service component (e.g., a payment application) configured to interface with the NFC chip of the user computing device 110 to communicate user payment tokens to the merchant point of sale device. To ensure security of user information, the provider application 112 may include sandboxing functionalities where a unique user ID (UID) is assigned to the provider application 112, and where only other applications (e.g., third party client applications 114) including the same UID may share information stored in relation to the provider application 112.

In various other arrangements, the user-specific payment information may be stored in a trusted execution environment (TEE) within a processor the user computing device 110. The systems and methods disclosed herein may also be used with other modalities currently available for storage and transfer of user payment device via contactless communication mechanisms. In the example shown, the provider application 112 operates under an HCE framework. As such, to conduct a mobile wallet transaction utilizing the provider application 112, the user computing device 110 may communicate with the mobile wallet computing system 130 (or other system) to retrieve a token for use in the conductance of a mobile wallet transaction.

In some arrangements, the provider application 112 is structured to enable the user to manage a mobile wallet and other accounts held at the financial institution. In this regard, the provider application 112 includes a presentation tier configured to control and manage displays or GUIs presented to the user via the provider application 112. As described herein, the presentation tier includes access points to a diverse array of functionalities to streamline the user's experience. For example, the presentation tier may be configured to present the user with the GUIs described with respect to the figures herein.

In another aspect, the provider application 112 includes an authentication sequence that significantly departs from those of existing systems to further streamline the customer's access to various features. For example, in various existing systems, authentication of the user is required prior to the user viewing various forms of information (e.g., account balance information) or performing tasks (e.g., entering a payment amount for a P2P transaction, selecting an account, etc.) to conduct a transaction. This may prevent the user at times from utilizing various functions, as the user may prefer to avoid the authentication if busy.

To cure these deficiencies, the provider application 112 may be structured to cause the user computing device 110 to request PUI from, for example, the financial institution computing system 120 in response to various pre-conditions. An example of such a pre-condition may include the user entering the provider application 112, which may cause the user computing device 110 to request PUI used to populate the home-screen of the provider application 112. Such information may include, for example, a listing of user accounts, balances associated with the user accounts, and/or recent transactions. Another pre-condition may involve the user indicating a preference to conduct a mobile wallet transaction, which may cause the user computing device 110 to request a listing of accounts that have been provisioned to the user's mobile wallet (e.g., from the mobile wallet computing system 130).

In some embodiments, the provider application 112 includes an interactive chat bot feature enabling the user to dictate data process flows by inputting commands in everyday language. For example, in some embodiments, the provider application 112 includes a function-to-keyword lookup table such that a corresponding function of the provider application 112 is called in response to the user inputting a command. In one example, the user may provide an input (e.g., by typing a message into a message prompt or providing a voice command) to view a balance of a checking account. In response, via the function-to-keyword lookup table, an appropriate function is called to request balance information of the checking account from the financial institution computing system 120 and present it to the user. Other functionalities (e.g., the mobile wallet, bill payments, card-free ATM, etc.) described herein may be accessed in a similar manner. As such, the provider application 112 provides personable access to various features described herein.

Third party client applications 114 are structured to provide the user with access to services offered by various third parties. In some arrangements, the third party client applications 114 are hard coded into the memory of the user computing device 110. In other embodiments, these applications may be web-based interface applications, where the user has to log onto or access the web-based interface before usage, and these applications are supported by a separate computing system comprising one or more servers, processors, network interface circuits, or the like (e.g., third party computing systems 140), that transmit the applications for use to the mobile device.

In various embodiments, the third party applications 114 include elements providing access to products offered by or otherwise associated with the financial institution. For example some such products may be related to conducting various forms of transactions (e.g., via a mobile wallet, bill payments, etc.) using services provided by the financial institution. Accordingly, the third party applications 114 may include applets exposing various elements enabling the user to access services offered by the financial institution within the third party application 114. Such access may be enabled or otherwise facilitated by various APIs. For example, one API may enable a transfer of user account information to a third party computing system 140 to facilitate the user selecting an account and making a payment within the third party computing system 140 (e.g., via the mobile wallet provided via the mobile wallet computing system 130).

In some embodiments, various other products (e.g., mortgages, lines of credit, other forms of loans, etc.) offered by the financial institution may be accessible to the user via third party applications 114. For example, one third party computing system 114 may offer the user a set of products offered by the financial institution. The set of products may be tailored based on needs of the third party. For example, one third party offering a calendar application may offer a bill payment service to the user via an associated third party client application 114. In response to the user accepting the offer, an API may facilitate the exchange of user bill payment information to the third party computing system 140 to enable the user's bill payments to be presented via a calendar. In another example, a third party assisting users in forming a business may offer an incorporation service to the user, and an API may facilitate the transfer of necessary information (e.g., documentation pertaining to incorporation or taxes) to the third party computing system 140 in response to the user accepting the offered service. Such integration facilitates the seamless provision of services to the user without requiring the user to even open the provider application 112.

The client application 114 may also be structured to facilitate transactions and management of accounts held by, for example, the user at a third-party service provider associated with the third party computing system 140. Accordingly, in some arrangements, the client application 114 is communicably coupled via the network circuit 118 over the network 150 to the third party computing system 140. In some embodiments, the client application 114 is a web-based application (e.g., provided via the third party computing system 140). As will be understood, the level of functionality that resides on the user computing device 110 versus the third party computing system 140 will vary depending on the implementation.

Figure 2:
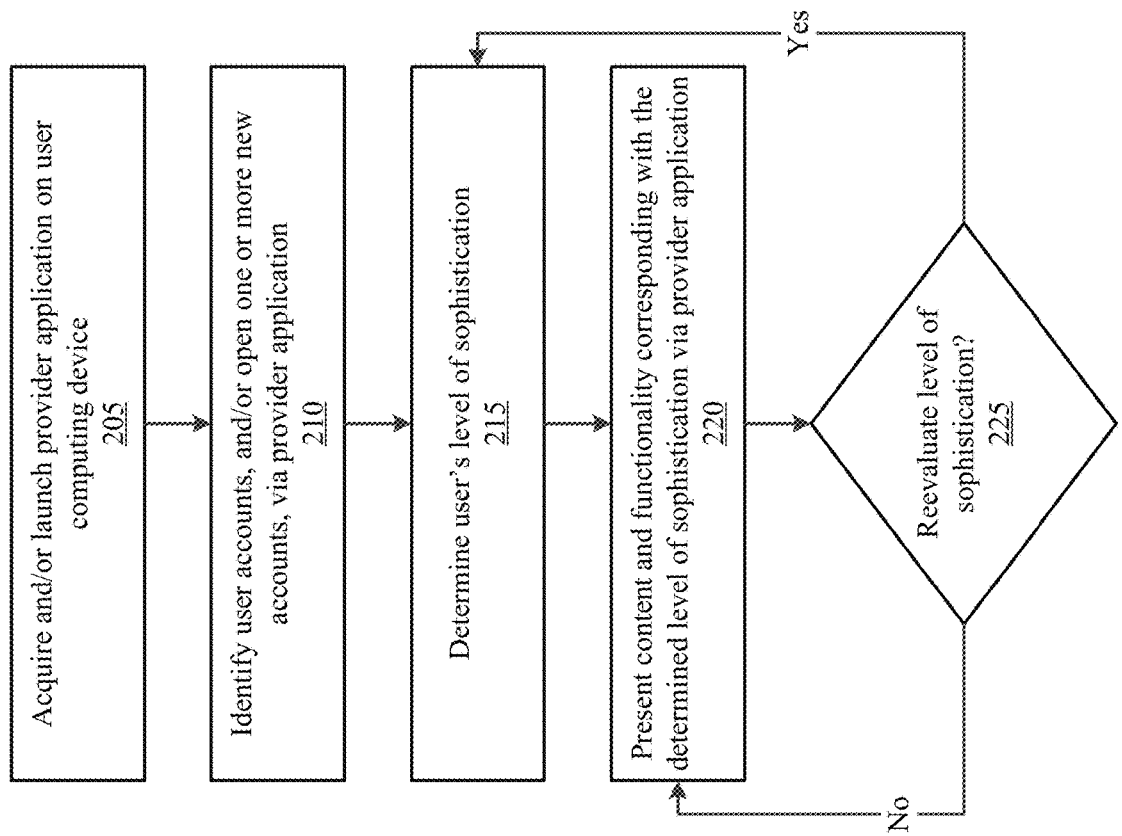
FIG. 2 is a flow diagram of a method for providing a dynamic user experience via one or more software applications running on a user computing device, according to example embodiments.

Referring now to FIG. 2, a flow diagram of a method 200 of providing users with dynamic content and functionality is presented, according to an example embodiment. Method 200 may be performed by the components described with respect to FIG. 1 such that reference may be made to the components contained therein to aid in the description of the method 200. Method 200 may be performed by, for example, the user computing device 110 (e.g., via a processor thereof) running a provider application 112.

At process 205, one or more user inputs for accessing the provider application 112 are received at the user computing device 110. In an example where the user computing device 110 is a smartphone, the user may select an icon (or other selectable element) via a display device of the smartphone to provide such inputs. If the provider application 112 is not already available on the user computing device 110, the user may acquire the provider application 112 via, for example, the financial institution computing system 120 or a third party computing system 140 (e.g., a digital distribution platform such as the "App Store" or "Google Play"). When the provider application 112 is installed on the user computing device 110, the user may "launch" or otherwise begin executing the provider application 112. This input may serve as a command to an operating system of the smartphone causing the smartphone to initialize or otherwise transfer the provider application 112 from the background to the foreground.

At process 210, one or more user accounts may be identified to the provider application 112 so that the provider application 112 may access data maintained in the user accounts. The user may identify the user accounts by making selections and/or entries into the provider application 112. If there is no existing account, the provider application 112 may initiate a process of opening a new account. The new account process may be initiated in response to an inquiry by the provider application 112 asking whether the user would like to open a new account, and detection of an affirmative response by the user (such as by selection of an icon or spoken words indicating a desire to open a new account). In various embodiments, the user account is a financial account such as a checking account maintained by the financial institution associated with the financial institution computing system 120. In other embodiments, the user account is a financial account maintained by a third-party financial institution.

The provider application 112 may communicate (via network 150) with the financial institution computing system 120 (or with a third-party computing system 140 of another financial institution if the user account is maintained by another financial institution) to access the user account. The provider application 112 may acquire the login credentials or other information needed to access the user accounts from the user. This may include, for example, a username and password, and/or other authenticating information, such as a biometric (e.g., voiceprint, fingerprint, etc.), personal information, secret codes, personal identification numbers (PINs), etc.

At process 210, in various versions, the user may also identify one or more other linked or associated entities who may receive funds from the user, or provide funds to the user electronically via application 112. Associated entities may include family members, friends, classmates, roommates, landlords, employers or other sources of funds, merchants, etc. In some implementations, the user identifies, as potential associated entities, individuals who also have user computing devices running the provider application. The user may identify associated entities by, for example, providing an e-mail address used by the associated entity (e.g., an email address provided by the associated entity to the provider application running on the entity's computing device) and/or by entering other identifying information (e.g., a code generated, at the request of the associated entity, by the provider application running on the computing device of the associated entity, with the code indicating that the associated entity agrees to be associated with the user). In some implementations, the associated entity may be sent an e-mail inviting the entity to become associated with the user. In some implementations, the invitational e-mail is sent by the financial institution computing system 120 or third party computing system 140. The invitational e-mail may include instructions for accepting the invitation, such as clicking a hyperlink, transmitting a reply message, and/or entering authentication information (e.g., login credentials) via the provider application or a website. In some implementations, the associated entity may identify and/or open one or more accounts (with the financial institution associated with the financial institution computing system 120 or with third-party financial institutions) to be used for funds transfers involving the user.

At process 215, the user's level of sophistication may be determined. In various implementations, the level of sophistication is determined at the user computing device 110. For example, the provider application 112 may make a determination by evaluating various data that are accessible or otherwise available to the provider application 112. In some implementations, the level of sophistication may be determined by or via the financial institution computing system 120 and/or the third party computing system 140. The data used to determine level of sophistication may be acquired via the provider application 112 (e.g., based on the interaction of the user with the provider application 112, or based on responses to inquiries or other information entered into the provider application 112), the financial institution computing system 120 (e.g., financial account transactions and other records), one or more third party computing systems 140 (e.g., a credit reporting agency with a credit score or other information on the financial circumstances of the user), and/or one or more computing devices (or the provider applications running thereon) of one or more associated entities (e.g., what percentage of the user's funds are sourced from other entities).

In various embodiments, the level of sophistication ("level" or "tier") may be determined in different ways using different data. Any number of levels may be identified based on available data. The levels may range, for example, from lower levels or tiers corresponding to relatively unsophisticated users, to higher levels or tiers corresponding to relatively sophisticated users. For example, a user who has never had a bank account and has no credit history may have the lowest level of sophistication when he or she first starts using the provider application 112 (which may be designated as, e.g., "level 1," "tier 1," "low," or "novice"). Once the user has used the provider application 112 for some time and demonstrated comfort with financial information, shown an ability to budget effectively, gained greater financial independence, etc., the user may be deemed to have higher levels of sophistication.

Levels may be based on any combination of data related to the user's activities and behaviors, such as one or more of: time elapsed since first bank account or credit card was opened; income; ratios such as ratio of income to expenses or ratio of income to debt; credit score or credit history; age; variety and types of expenditures; number and/or timing of payments (e.g., how many bills or other expenses are paid by the user and whether bills are paid on time); level of financial independence (e.g., fraction of income received from employers versus from family members or other benefactors); responses to inquiries regarding needs and/or comfort level with financial data; and the like.

When multiple criteria are considered in determining a user's level of sophistication, the criteria are not necessarily weighted equally, such that certain criteria may be more influential in determining the user's level of sophistication than other criteria. In some implementations, each criterion may be associated with a certain number of "points," potentially up to a certain maximum number of points. The number of points contributed by each criterion may be computed, and the points from all relevant criteria summed to obtain a total number of points. As an illustrative example, the user's financial independence may contribute a maximum of 20 points, with the number of points determined by multiplying the fraction of funds earned (as opposed to funds received from family) by 20 points. In this example scheme, 100% financial independence earns 20 points, while 50% financial independence earns 10 points, and so forth. Each level of sophistication may be associated with a certain range of points, such that knowing the range in which a user's total points falls indicates the user's level of sophistication. For example, the user may be identified as "level 1" with a point total between 0 and 19 points, "level 2" with a point total between 20 and 49 points, "level 3" with a point total between 50 and 99 points, and "level 4" once 100 points is reached. In the above example, if the user is 100% financially independent, the user would be determined to be at least level 2, even if no points are contributed from computations involving other criteria.

In one example, provider application 112 can "grow" with a college student based on his or her needs and financial knowledge to provide the functionality needed for the student's current financial stage in life and also prepare him or her for next steps by introducing new functionality in easily consumable steps. It may be determined that the student is at "level 1" based on, for example, the student being a freshman at college with a bank account opened by his or her parents. Observed behaviors that may be consistent with the level 1 determination may include the student being mainly concerned with checking his or her balance (e.g., to make sure he or she has enough money for today or this week), checking his or her recent transactions (e.g., to detect fraud), and to make ad hoc peer to peer (P2P) payments to friends for shared expenses. Additional factors that may weigh in favor of the level 1 determination may include the student living in a dorm and/or having his or her parents pay for all, most, or a significant portion of his or her expenses. The application experience provided for such a level 1 student may include, in certain implementations, an "Available to Spend" balance prominently displayed for ease of use. In some versions, recent transactions may be shown in a list with some basic categorization. P2P payments may be easy to access both from a screen widget and/or from within the application itself. Based on what is known of the student, certain offers might be made available with the ability to easily share the expense with another student. Menus may be fairly simple and designed not to be overwhelming in terms of amount of information or options presented to the level 1 user. Provider application 112 may make common tasks simple to accomplish and basic information easy to see and understand for level 1 users.

Once the student is older and has moved out of the dorm and into his or her own apartment, the student may be deemed to be a "level 2" user in various implementations. Such a determination may be based at least in part on, for example, the student having a part time job, although his or her parents may still provide money for most (or a significant portion) of her expenses. The level 2 student may be determined to be responsible for taking money provided by his or her parents and paying his or her own bills (instead of having his or her parents paying the bills directly). The provider application 112 may expand the options available to the level 2 student based on the student's needs. Provider application 112 may begin teaching the level 2 student how to budget his or her money while not overwhelming the student with too much information. Once the student is ready to graduate and/or is starting a full-time and will be responsible for paying his or her own bills, the student may be deemed to be a "level 3" user, in various embodiments. The student has been learning how to manage his or her money as a level 1 and level 2 user. The student's personal financial habits (e.g., effective budgeting, bills paid on time, etc.) may be used to identify, confirm, or maintain the student as a level 3 user. In different embodiments, based on financial habits, behaviors, knowledge, etc., a freshman who is already putting himself or herself through school may be deemed to be at a higher level of sophistication than a graduate.

Each level or tier may have a corresponding set of content and functionality that is available to the user. Higher levels have functionality not available at lower levels. At process 220, the user is presented, via the provider application 112, with the content and functionality corresponding with the determined level of sophistication. This provides varied user experiences as the user's level of sophistication increases. The provider application 112 may thus evolve as the user learns. The content and functionality for each level may be selected so as to not overwhelm the user (and potentially discourage the user from using the provider application to keep track of his or her finances). For example, a high school or college student accessing his or her first checking account and using an associated debit card to pay for expenses may not be ready to (or may not need to) track a budget extending a month or more into the future when first beginning to use the provider application 112. The student may also not be ready for certain financial products (e.g., a credit card) until he or she has a track record of paying bills on time. But, once a user has more financial independence, more expenses to track, financial goals (such as saving for a trip, a car, a baby, or other purchases), etc., the user may be ready for other functionality, such as defining goals, setting aside funds to achieve the goals, acquiring a credit card to build a credit history, etc. Examples of differing content and functionality are discussed below.

At process 225, it may be determined whether the user's level of sophistication is to be reevaluated. In some implementations, the user's level of sophistication may be automatically reevaluated periodically, such as once a week, month, quarter, etc. In such implementations, it may be determined that a sufficient amount of time has passed in determining whether to reevaluate level of sophistication at 225. In certain implementations, the user's level of sophistication may be reevaluated based on certain triggers. For example, the triggers may include the user paying a certain number of bills on time, the user setting up a direct deposit for being paid by an employer, etc. In such implementations, it may be determined that a value associated with a trigger (a "trigger value") has changed in determining whether to reevaluate level of sophistication at process 225. If the level of sophistication is to be reevaluated, method 200 may return to process 215. If the level of sophistication is not to be reevaluated, method 200 may continue with process 220 by presenting content and functionality corresponding with the current level.

Figure 3:
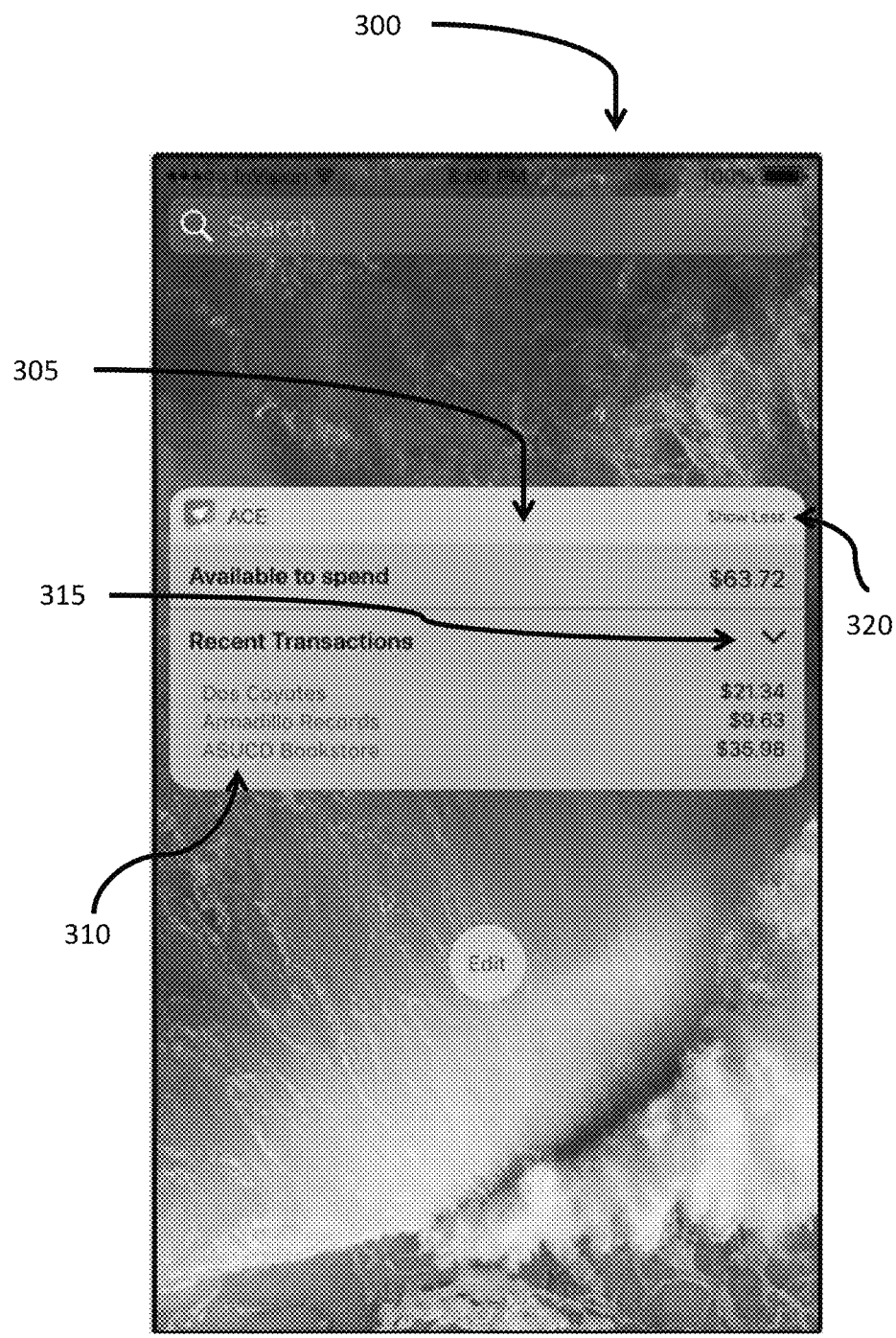
FIG. 3 is a widget for an application running on a mobile user computing device, according to example embodiments.

FIG. 3 shows an example GUI 300. In an example embodiment, the GUI 300 is a widget provided via the operating system of the user computing device 110. Where the user computing device 110 is a smartphone or tablet, the widget may be provided at the home screen of the user computing device 110. In some implementations, the provider application 112 may be running in the background to provide the operating system with information to be presented via the widget. The user may be presented with a snapshot of his or her finances or otherwise with a subset of the information that is accessible via the provider application 112. As shown, GUI 300 includes tile 305 informing the user that he or she has $63.72 available to spend in his or her account(s). The widget also provides a list of recent transactions 310. The widget may allow the user to expand the list of recent transactions by selecting the "down" arrowhead 315. The user may also be provided with the option to view less (or, in other implementations, more) information by selecting icon 320 to "Show Less". Selecting icon 320 may shrink the tile, such that only the funds that are available to spend are shown, or such that only the name of the provider application 112 (as shown, "ACE") is shown and not the recent transactions 310.

Figure 4:
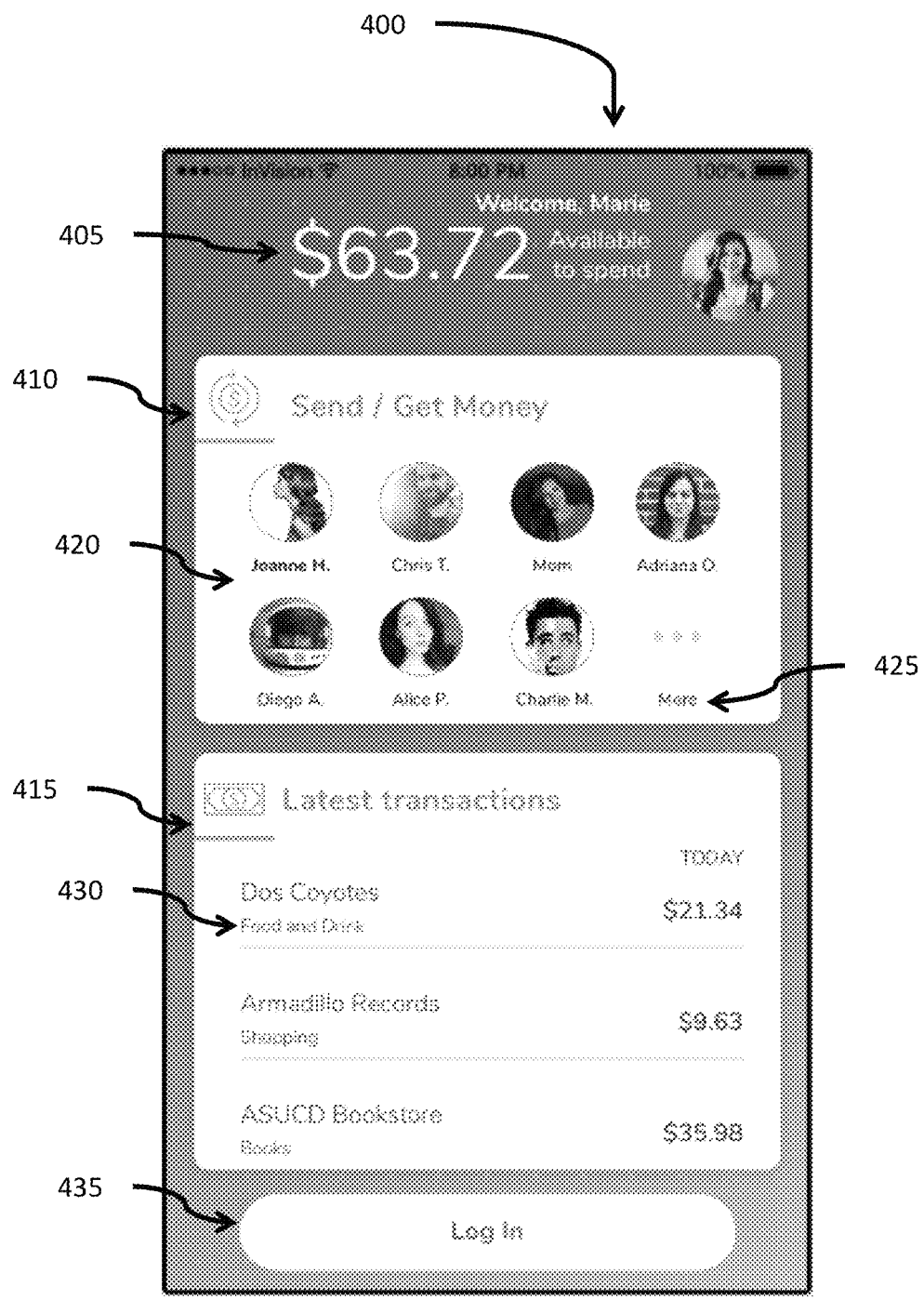
FIG. 4 is a graphical user interface providing one or more functionalities available starting at a first level of sophistication via an application running on a mobile computing device of a user, according to example embodiments.
Figure 5:
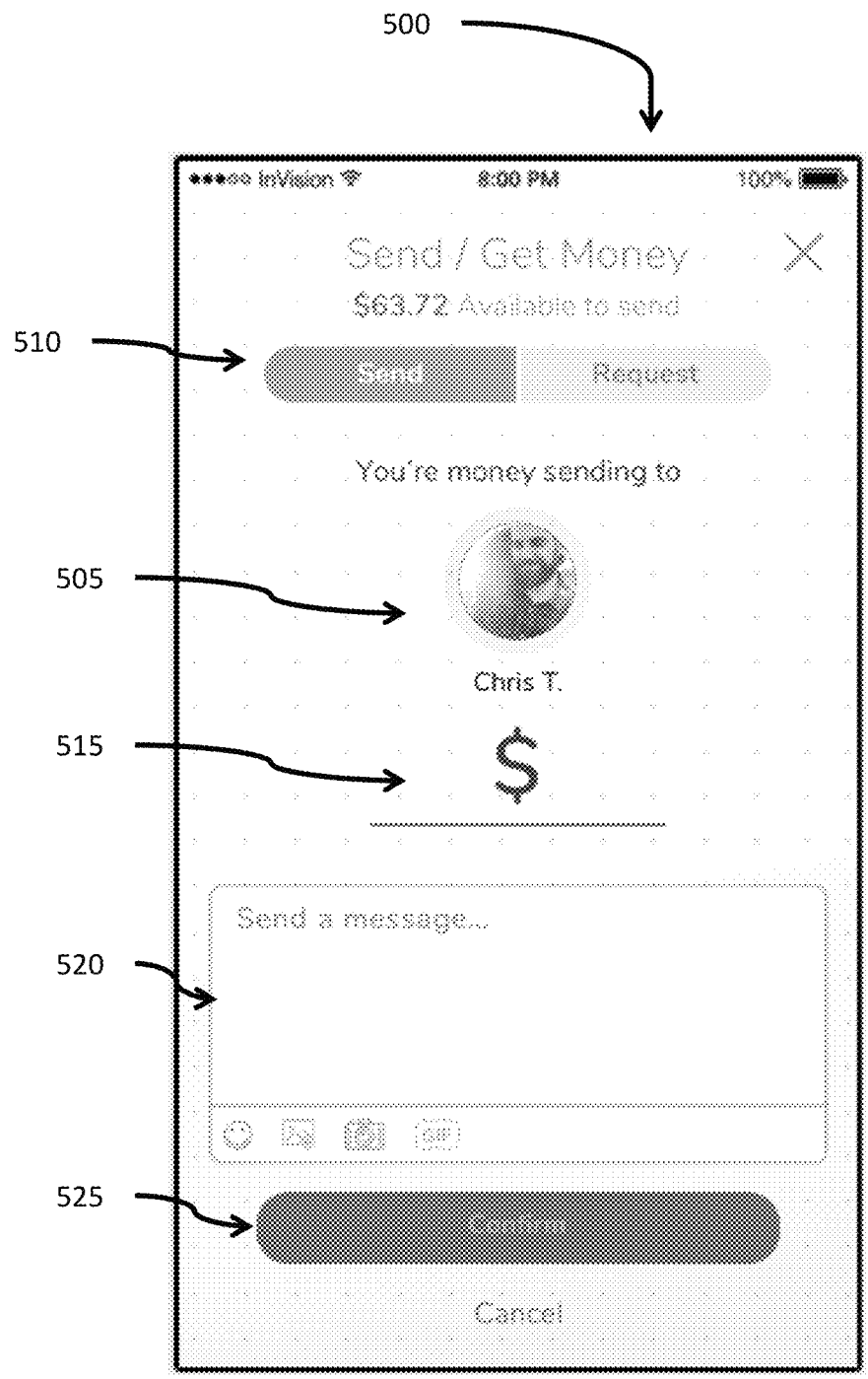
FIG. 5 is a graphical user interface providing a funds transfer functionality available starting at a first level of sophistication via an application running on a mobile computing device of a user, according to example embodiments.
Figure 6:
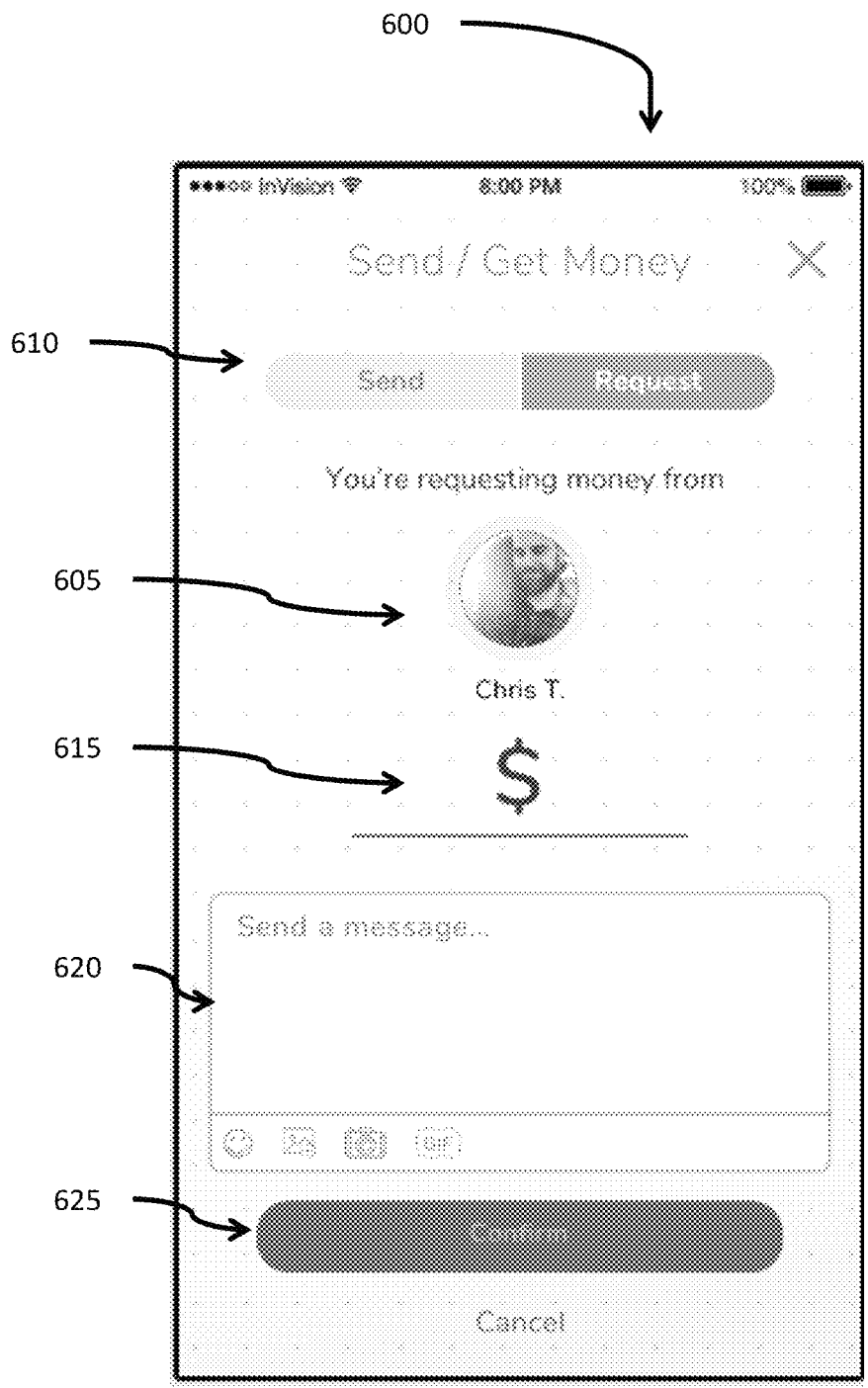
FIG. 6 is a graphical user interface providing a funds request functionality available starting at a first level of sophistication via an application running on a mobile computing device of a user, according to example embodiments.

FIG. 4 shows an example screen for provider application 112 that may be presented to the user prior to the user being authenticated. In other words, other than providing the input to access the provider application 112 at process 205, no other actions of the user are necessary to view GUI 400 in certain implementations. As shown, GUI 400 includes an account balance portion 405, a funds transfer portion 410, and a transaction information portion 415. The account balance portion 405 indicates that the pictured user ("Marie") has $63.72 available to spend. This amount may be determined by summing the available balances in the user accounts that are linked with or otherwise accessible to the provider application 112. In some implementations, the "available to spend" amount is the total sum of account balances minus all known obligations (e.g., rent, bills due, scheduled funds transfers, and/or other anticipated expenditures) or a subset of known obligations (e.g., obligations for the upcoming week or of a certain type). The funds transfer portion 410 includes a set of associated entities 420. The user may select one of the entities to send money to the entity, or request money from the entity. As shown, the user has additional associated entities that do not fit in the funds transfer portion 410, and the additional associated entities may be viewed by selecting the "more" icon 425.

The transaction information portion 415 includes information on the user's transactions involving the user's account(s). The transactions that are listed may be the most recent transactions (i.e., listed in reverse chronological order), or the transactions may be selected in another way (e.g., the largest transactions during a certain time period, such as the past week, or the transactions of the day may be listed). Each transaction may be categorized to help with budgeting or other analysis of the user's spending habits. As shown in GUI 400, the user spent $21.34 today at Dos Coyotes, which was an expenditure in category "Food and Drink" 430. Such a "snapshot" may by default be provided before authentication (unless the user chooses not to be provided with such information before authentication). To view more details, engage in transactions, or otherwise perform actions, the user may select icon 435 to begin an authentication process to log into the provider application 112. The authentication process may involve the user entering or otherwise providing login credentials (e.g., a username and password), biometric data (e.g., fingerprint or facial scan), or other data to authenticate himself or herself.

If the user selects one of the associated entities in funds transfer portion 410, the provider application 112 may present GUI 500 or GUI 600. GUI 500 shows at 505 that the user selected "Chris T." as the associated entity to receive funds. The provider application 112 may, by default, provide the GUI 500 for sending money when the associated entity is first selected. The user may then be allowed to switch to requesting money via the Send/Request icon 510. As shown in GUI 500, "Send" is highlighted in the Send/Request icon 510, and the user is able to enter an amount to send via field 515. The user may use messaging portion 520 to provide a message (in the form of text, images, video, emoticons, attachments, GIFs, etc.) to be sent to the recipient of the funds (as shown, Chris T.). The user's message (entered into messaging portion 520) may be incorporated into or included with a notification message to be sent to the recipient informing him or her of the funds transfer.

In some implementations (not illustrated), if the user enters more money in field 515 than is available to the user (e.g., the enters any amount over the $63.72 that is available to spend), the provider application 112 may display a warning message (e.g., "You don't have enough money" in red-colored text) to inform the user that he or she does not have enough available funds to send the amount entered in field 515. Once the user has entered a valid amount, the user may select the confirmation icon 525 to proceed with the funds transfer. To initiate the funds transfer via GUI 500, the provider application 112 may authenticate the user upon confirmation that the user would like to proceed. This may be accomplished by, for example, the provider application 112 accepting biometric data (e.g., via a message stating "Touch ID to "confirm"), a security code which may have been previously selected by the user (e.g., when the checking account being used for the transfer was opened or when such transfers were authorized), or another means.

If the user selects "Request" via the Send/Request icon 510, or is provided with the "Request" page by default, the provider application 112 may present GUI 600, which identifies at 605 the associated entity who is to receive a request for funds (as shown, Chris T.). GUI 600 also includes a Send/Request icon 610 to allow the user to switch to sending money to the associated entity. The field 615 allows the user to enter an amount to be requested, and messaging portion 620 may allow the user to include a message with the request (e.g., to provide an explanation for why the money is being requested or how the user plans to use the requested money). The message may include text, images, video, emoticons, attachments, GIFs, etc. Once the user has entered the amount to be requested, the user may select the confirmation icon 625 to proceed with sending of the request for money.

In some implementations, funds transfers may involve one or more mobile wallet computing systems 130 directly or via the financial institution computing system 120. For example, the provider application 112 may, in response to the user specifying an associated entity and an amount to be paid to the associated entity, communicate with a mobile wallet application to complete the transfer. The mobile wallet application, which may be a third party client application 114, may communicate with a mobile wallet computing system 130 associated with the financial institution that is associated with the financial institution computing system 120, or with another financial institution. In some implementations, the provider application 112 communicates with the financial institution computing system 120 to transfer funds to entities which may have accounts maintained by the financial institution associated with the financial institution computing system 120. In other implementations, the provider application 112 may directly communicate with mobile wallet computing system 130 to request or initiate funds transfers with accounts of associated entities.

Figure 7:
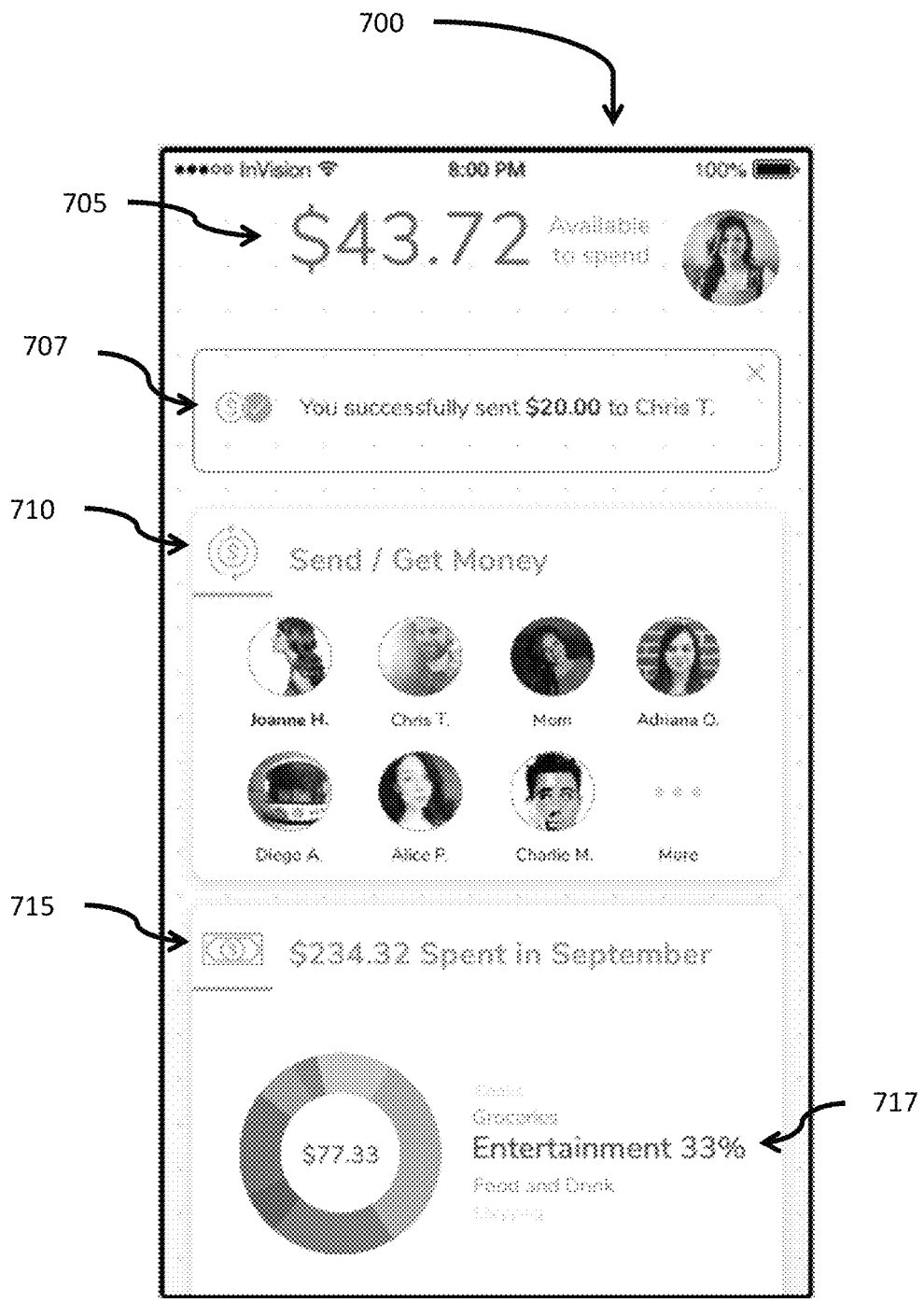
FIG. 7 is a graphical user interface providing one or more functionalities available starting at a first level of sophistication via an application running on a mobile computing device of a user, according to example embodiments.

In FIG. 7, an example GUI 700 is presented. As shown, the user may be provided with a confirmation message 707 once the funds transfer to "Chris T." has been initiated or completed. As shown, GUI 700 includes an account balance portion 705, a funds transfer portion 710, and a transaction information portion 715. The account balance portion 705 indicates that "Marie" now has $43.72 to spend, following a transfer of $20 to "Chris T." The transaction information portion 715 indicates that $243.32 was spent in a specified month (e.g., the current month). The provider application 112 may allow the user to scroll through expense categories (e.g., books, groceries, entertainment, food and drink, etc.) using a selector 717 to choose a category for more detailed information. As shown, the category of "Entertainment" has been selected, and the transaction information portion 715 indicates that 33% of the $234.32 spent in September corresponded with the entertainment category. Transaction information portion 715 also indicates, at the center of the multi-colored circle, that the amount spent on entertainment was $77.33 (with differently-colored portions of the circle corresponding with the individual transactions that sum to $77.33).

Figure 8:
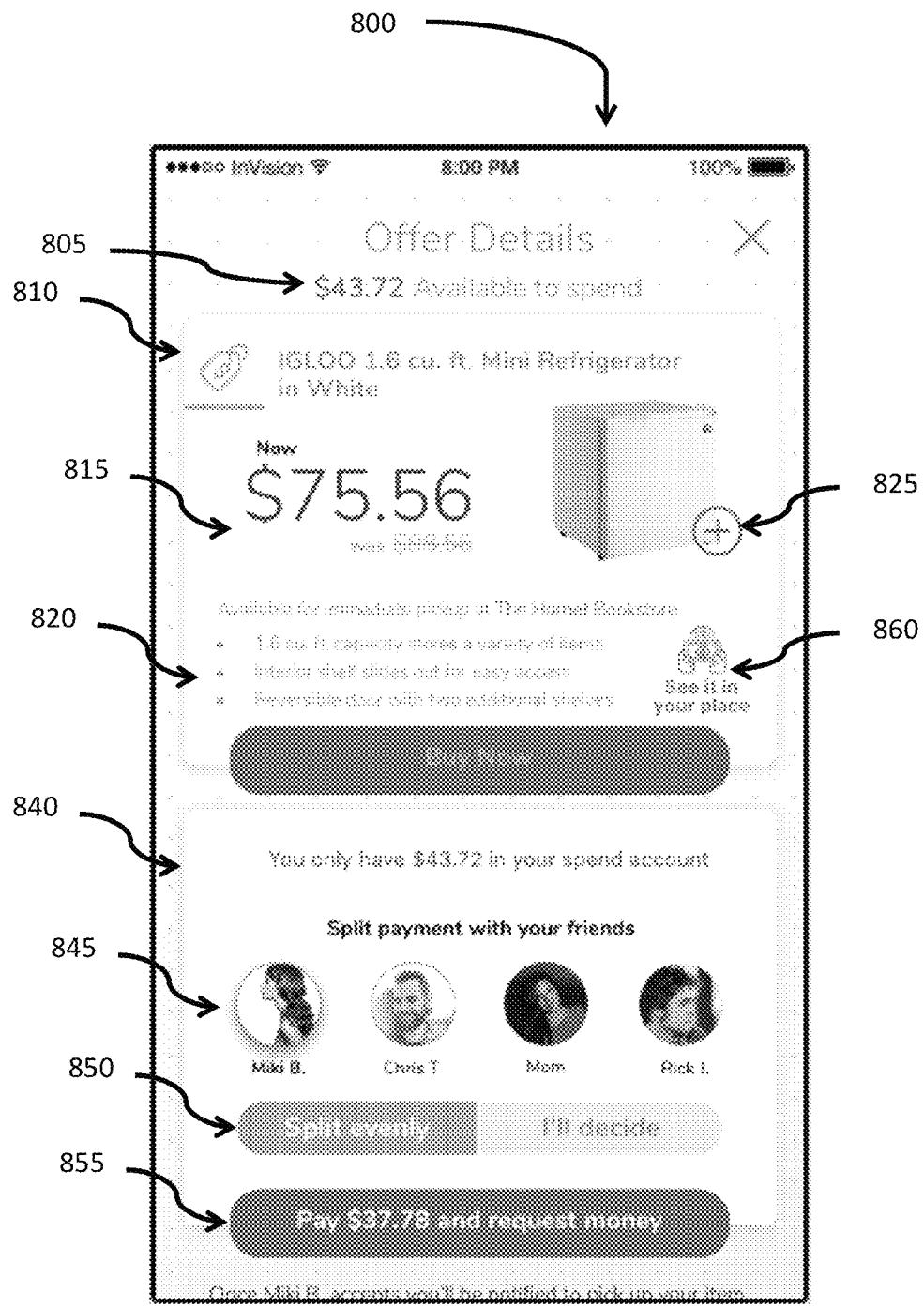
FIG. 8 is a graphical user interface providing one or more functionalities available starting at a first level of sophistication via an application running on a mobile computing device of a user, according to example embodiments.

FIG. 8 shows an example GUI 800 showing provider application 112 presenting the user with an offer page tailored to the anticipated needs of the user. The GUI 800 may indicate, at 805, the funds available for purchases. The available funds (as shown, $43.72) need not be simply the user's account balance. Rather, the amount of funds that are available to spend may, in some implementations, be determined by subtracting (from funds available in the user's accounts) any amounts allocated or otherwise set aside for, for example, goals (e.g., a larger purchase, such as a car or a trip), for bills (e.g., utilities, loan payments), for anticipated expenses (e.g., food and rent), etc. Similarly, the available funds may also, in some implementations, include funds that are anticipated but not yet received, such as direct deposits from an employer, periodic deposits from parents, amounts requested from certain associated persons, funds transfers that have been initiated with the financial institution but not yet completed, etc. In certain implementations, the GUI 800 may indicate multiple amounts, such as an account balance, an amount that includes anticipated or predicted deposits, an amount that excludes anticipated expenses over a certain time period, and/or a net total that adds predicted deposits and subtracts predicted expenses from account balances. The time horizon for anticipated expenses and predicted deposits may vary (e.g., three days, a week, a month, a quarter, a semester, etc.) depending on the circumstances and/or needs of the user. For example, for a student, the time horizon for expenses may be the current academic semester, such that the student does not spend so much that the student does not run out of funds before the current semester has ended.

GUI 800 may include an offer details section 810, which as shown, presents the user with an offer for a miniature refrigerator. This may be based on provider application 112 determining, for example, that the user is moving into a dorm room, small apartment, or other living arrangement in which such a product may be deemed useful. The user's circumstances may be determined using various sources of information, including information associated with the financial account (e.g., the residential address of the user, cross-referenced with real estate or other information accessed via third party computing systems 140), transaction history (e.g., a number of purchases at a vending machine in a dorm of a college, potentially made using a debit card that draws from the financial account), user inputs (e.g., responses to a questionnaire intended to learn about the user's circumstances), etc. When a type of product is identified as potentially relevant to the user, provider application 112 may access third party computing systems 140 (e.g., those of various merchants) to identify product specifications and costs (and "shop around" for discounts by accessing multiple third party computing systems 140 of multiple providers of goods and services) for the product. The offer details section 810 may also include a cost and discounts section 815, which as shown indicates that the refrigerator costs $75.55, discounted from $98.56, and provides an image of the item (which may be an image retrieved from a third party computing system 140 or retrieved from an image database, of the actual product or of a generic representation of the product). The offer details section 810 may also include a specifications section 820, with information about the product and its source. Additionally, the offer details section 820 may include an additional image icon 825 that allows the user to see additional images of the product and/or to zoom into or enlarge the image to see more detail.

GUI 800 also includes a payment scheme section 840 with various options for acquiring the item described in the offer details section 810. Because the product being presented may cost more than is available to the user (as shown, the product costs $75.56, while the user has $43.72 available to spend), the payment scheme section 840 may provide the user with the option to split the cost of the item with one or more associated entities 845. The provider application 112 may allow the user to select one or more associated entities, and indicate how to split the expenses at 850. The GUI 800 may allow the user to split the cost evenly, or to indicate another way to split the costs (by selecting, e.g., "I'll decide" and entering percentages or particular amounts). If the user wishes to proceed with the purchase, he or she may choose, at 855, to pay for a fraction of the cost (e.g., half, or $37.78 as shown) and automatically send a request to one or more selected associated entities to contribute the remaining fraction of the cost. As shown, the user has selected to split costs evenly with the associated entity identified as "Miki B." by paying $37.78 himself or herself and requesting that the associated entity contribute the remainder.

The provider application 112 may then provide the user with a confirmation page with various information or messages (e.g., "Your request was sent to Miki B." and "We'll notify you when Miki B. accepts and also when your offer is complete. Enjoy!"). In some implementations, the user's share may then be subtracted from the user's available funds and allocated for the purchase, and when the required funds have been collected from associated entities, the purchase made. Another page, not illustrated, may be provided to the user to indicate that the associated entities have agreed to share the expenses, and asking the user and/or the associated entities to confirm delivery address, delivery speed, pickup time, pickup location, etc.

Figure 9:
FIG. 9 is an augmented reality experience associated with one or more functionalities available starting at a first level of sophistication provided via an application running on a mobile computing device of a user, according to example embodiments.

Referring to GUI 900 in FIG. 9, to help the user visualize an offered item if it were to be located in the user's environment, the provider application 112 may provide an augmented reality ("AR") option (via, e.g., an AR icon 860 presented in offer details section 810 of GUI 800). If the user selects the AR icon 860 (which, as shown, provides a representation of a hand holding a smartphone, with the words "See it in your place" below the representation), the provider application 112 may communicate with an imaging device available to the user computing device 110 and access imagery available to the imaging device. For example, in the case of a smartphone, the provider application 112 may initiate the smartphone's camera, retrieve images (e.g., a photograph or live stream) from the camera, and present the images on the smartphone's display screen within the provider application 112. The provider application 112 may then superimpose an image 910 corresponding to the offered product on the images from the imaging device. The image 910 may be, for example, a photograph of the item retrieved from a website of a third party, a catalog image retrieved from a third party computing system 140, etc. In some implementations, the image 910 may be a representation (generated by the provider application 112 or retrieved from the financial institution computing system 120 and/or a third party computing system 140) of an object. In various implementations, such a representation may be generic (e.g., a cuboid, sphere, etc.), generalized (e.g., having a shape that is stereotypical for the sort of item being offered, such as a stereotypical lamp shape), or specific (e.g., a "shadow" representation showing the overall shape of the particular item being offered without its specific contours, edges, and/or colors).

In various implementations, the provider application 112 determines the relative dimensions of objects in the imagery from the imaging device so as to display the item being visualized to scale. In some implementations, the provider application 112 may apply various computer vision techniques to determine scale. For example, object recognition may be used to identify objects with known, predictable, or estimatable dimensions (such as a musical instrument, a trash bin, a writing utensil, a computer screen, etc.). In some implementations, objects in imagery may be compared with known objects by cross-referencing the imagery with images and objects in an image repository that is accessible to the provider application 112 via the financial institution computing system 120 and/or via one or more third party computing systems 140. For example, the dimensions of identifiable paintings, picture frames, televisions, or other items hung on a wall may be used for determining scale relative to the item being visualized. In various implementations, provider application 112 determines the relative positions of objects to better estimate dimensions, such that two objects that appear to have the same size are recognized as having different actual sizes if one is determined to be closer to the imaging device than the other. In some implementations, the provider application 112 may recognize a floor or ground with open space, and position the item 910 in the open space, as shown in FIG. 9. Using AR to visualize the item in the user's environment may help users make more informed decisions for how to spend limited funds.

In some implementations, the provider application 112 may prompt the user to point the imaging device (e.g., the camera of a smartphone or tablet) at the location in a room at which the item would be placed if purchased. In certain implementations, the provider application 112 may prompt the user to indicate, via a user input (such as a keyboard entry or spoken voice command), the distance between two points to be used by the provider application 112 to determine relative dimensions and scale. Such distances may include one or more of: the distance between the imaging device and a wall against which the item would be placed; the distance between the two identified points of an object in the captured imagery (e.g., the left and right sides of a painting, or the top and bottom of a lamp); the height or width of an object, such as a table; etc. Alternatively or additionally, in certain implementations, the provider application 112 may allow the user to reposition the item once the image of the item has been superimposed on the display. For example, the provider application may insert the image of the item on the screen, and allow the user to "touch and drag" the item to position it where it will be located if purchased. In certain implementations, the provider application may additionally or alternatively allow the user to rescale an image of the item, such as by enlarging or shrinking the image (relative to its surroundings) using a slider that is adjusted or otherwise controlled by, for example, sliding a finger on a touchscreen (e.g., by sliding the finger up to enlarge the image and sliding the finger down to shrink the image).

Figure 10:
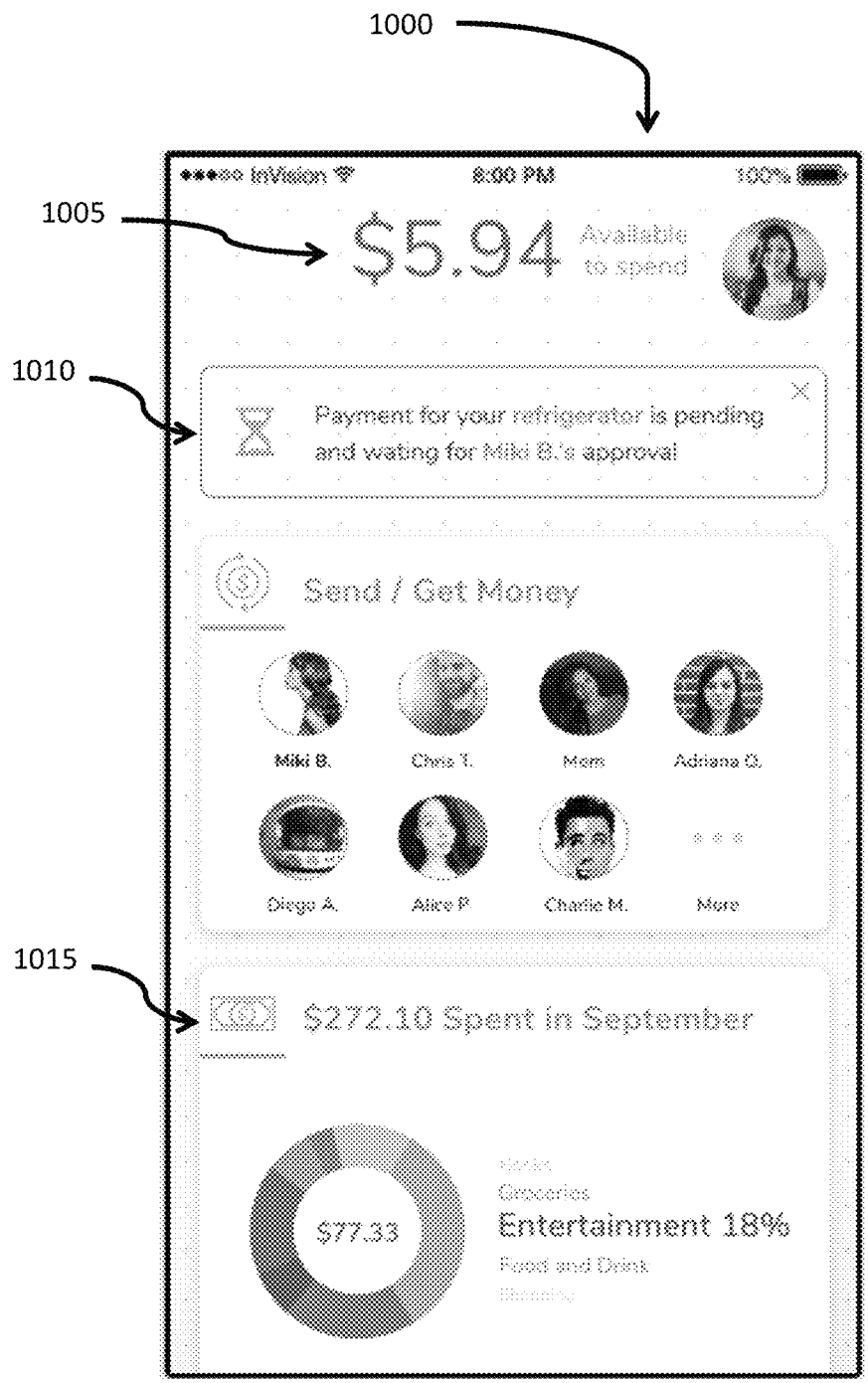
FIG. 10 is a graphical user interface providing one or more functionalities available starting at a first level of sophistication via an application running on a mobile computing device of a user, according to example embodiments.

GUI 1000 in FIG. 10 illustrates an example "landing" page after a request has been sent for funds to be contributed towards an item to be purchased. At 1005, the "available to spend" amount has been modified to reflect the funds remaining after the purchase (as shown, $5.94, which is $43.72 minus the $37.78 to be used for the refrigerator being purchased). In a status section 1010, GUI 1000 indicates that payment for the item (i.e., the refrigerator) is pending and awaiting approval by the associated entity ("Mild B.") with whom the cost for the item is to be split. A transaction information portion 1015 may be updated to reflect how much money was spent (and in what categories) in the identified time period.

Figure 11:
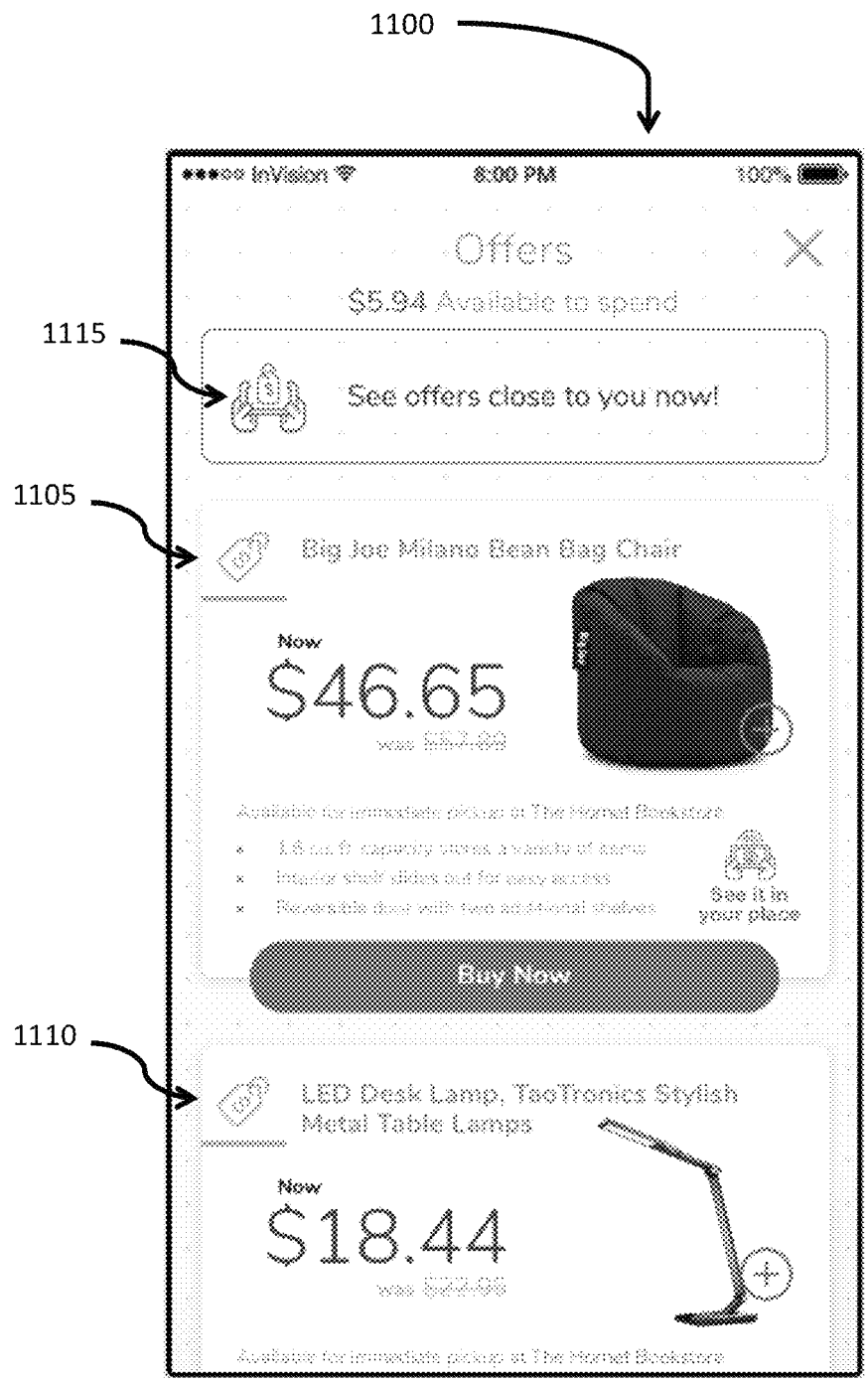
FIG. 11 is a graphical user interface providing one or more functionalities available starting at a first level of sophistication via an application running on a mobile computing device of a user, according to example embodiments.

Referring to GUI 1100 in FIG. 11, additional items that may be of interest to the user are presented in one or more offer pages (as shown, offer detail section 1105 for a chair, and offer detail section 1110 for a lamp). Additionally, provider application 112 may allow the user to request nearby offers by selecting a nearby offer icon 1115. When selected, the provider application 112 may access one or more geographic locating devices accessible to the user computing device. For example, in the case of a user computing device 110 that is a mobile device such as a smartphone, the provider application 112 may access a global positioning system (GPS) device and/or other components to determine what is nearby. In some implementations, if no real-time locating device is accessible, the provider application 112 may present offers nearby to the residence of the user, or near the last known location of the user, or near one or more locations frequented by the user. The locations frequented by the user may be determined, for example, using data on transactions involving the user account. For example, if the user frequently dines or shops at a set of restaurants or stores in a "quadrangle" ("quad") or mall at or near a college campus, the provider application 112 may search for offers at or near the quad or mall.

In some implementations, the provider application 112 may determine the geographic range for offers based on the observed or deduced "mobility" of the user. In some implementations, the user's mobility may be observed by, for example, tracking the geolocation of the user's computing device 110 (e.g., by periodically accessing a mobile device's GPS device). In certain implementations, the user's mobility may be deduced based on, for example, distances between the stores and restaurants from which items were purchased by the user. For example, if a user mostly eats at restaurants that are no more than two kilometers apart, the provider application 112 may use two kilometers as a radius for nearby offers, whereas if the user primarily only shops within the same two blocks, the radius used may be two blocks. In various implementations, the user's mobility may alternatively or additionally be based on whether the user is determined to use or otherwise have access to various modes of transportation, such as a vehicle owned by the user, a vehicle of a friend, family member, or roommate, public transportation (based on, e.g., payments for bus or train tickets), ride sharing services (based on, e.g., payments to ridesharing services of Uber Technologies, Lyft, Inc., etc.), taxi services, etc.

Figure 12:
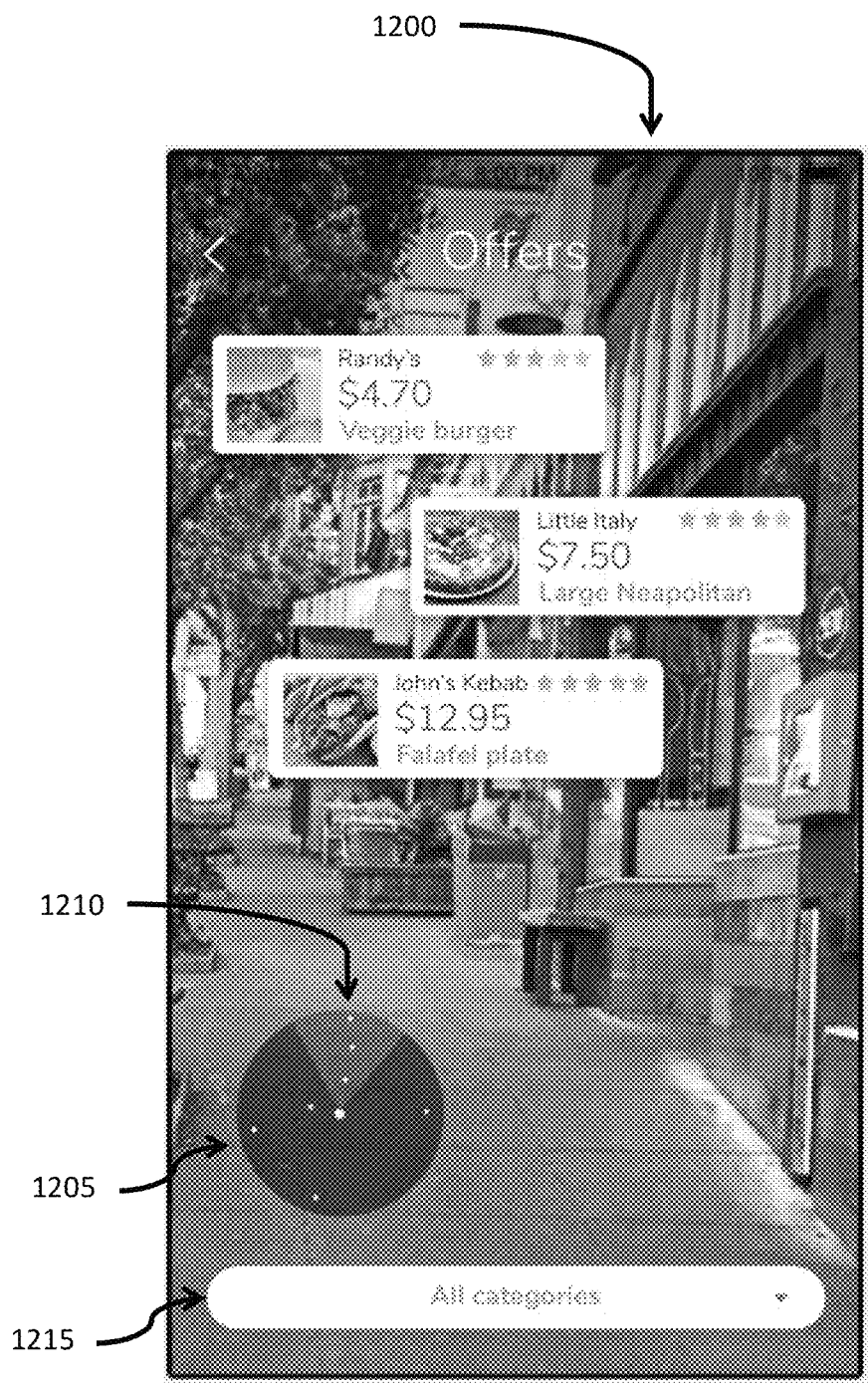
FIG. 12 is a graphical user interface providing one or more functionalities available starting at a first level of sophistication via an application running on a mobile computing device of a user, according to example embodiments.

In various implementations, selection of nearby offer icon 1115 additionally or alternatively results in the provider application 112 accessing an imagery device (e.g., a camera of a smartphone or tablet) of user computing device 110 to access imagery showing what potential sources of items may be in the vicinity of the user computing device 110 (and, presumably, the user). Referring to GUI 1200 in FIG. 12, the provider application 112 may, in various implementations, superimpose information and/or images (e.g., in the rectangular boxes adjacent to the location of the merchants in the imagery) over imagery of the merchants that are visible to the imagery device of the user computing device 110. In GUI 1200, the provider application 112 has identified three restaurants in the vicinity of the user (as shown, Randy's, Little Italy, and John's Kebab). Each restaurant includes items determined to be of potential interest to the user, along with a number of stars corresponding with user reviews of the restaurant or item. As shown, a veggie burger is available for $4.70 at Randy's, with a rating of three out of five stars, a large Neapolitan pizza is available for $7.50 at Little Italy, with a rating of four out of five stars, and a falafel plate is available for $12.95 from John's Kebab, with a rating of five out of five stars. The items of interest may be determined based on, for example, the prior transactions (e.g., purchases) of the user involving his or her user account, or based on responses to questions inquiring about the user's likes, dislikes, preferences, etc. Information about the items (and reviews therefor) may be accessed via, for example, third party computing systems 140 (e.g., systems of the merchants, review services, travel sites, information aggregators, etc.)

GUI 1200 also includes a locator circle 1205 with a white dot at its center corresponding with the relative location of the user computing device 110. Additional white dots are placed around the center to show the position of the offers relative to the user computing device 110. The radius of the circle may be preset (e.g., one kilometer, two blocks, etc.), customized for the user (e.g., based on the user's mobility, discussed above), set so as to include a predetermined number of establishments (e.g., a circle sized so as to only include a certain number of items or merchants) that are expected to be more manageable so as to not overwhelm the user, etc. The locator circle 1205 also includes a field-of-view sector 1210 corresponding with a region that is in the field of view of the imagery device of the user computing device 110. As can be seen in the viewable field of view sector 1210, three dots at varying distances "in front" of the user correspond with the three offers overlaid on the images of the corresponding restaurants on the display. As shown, if the user computing device is turned to the right, the user may face towards a merchant that is about the same distance away as the third (relatively farthest) restaurant (i.e., Randy's) in the field of view of the imagery device of the user computing device 110. In GUI 1200, the offers displayed are not "filtered" or otherwise limited by category or type, as indicated by category selector 1215 (which, as shown, indicates "All categories" are being included). The category selector 1215 may allow a user to select specific categories from a list (e.g., "Entertainment," "Restaurants," "Stores," etc.) to be presented.

Figure 13:
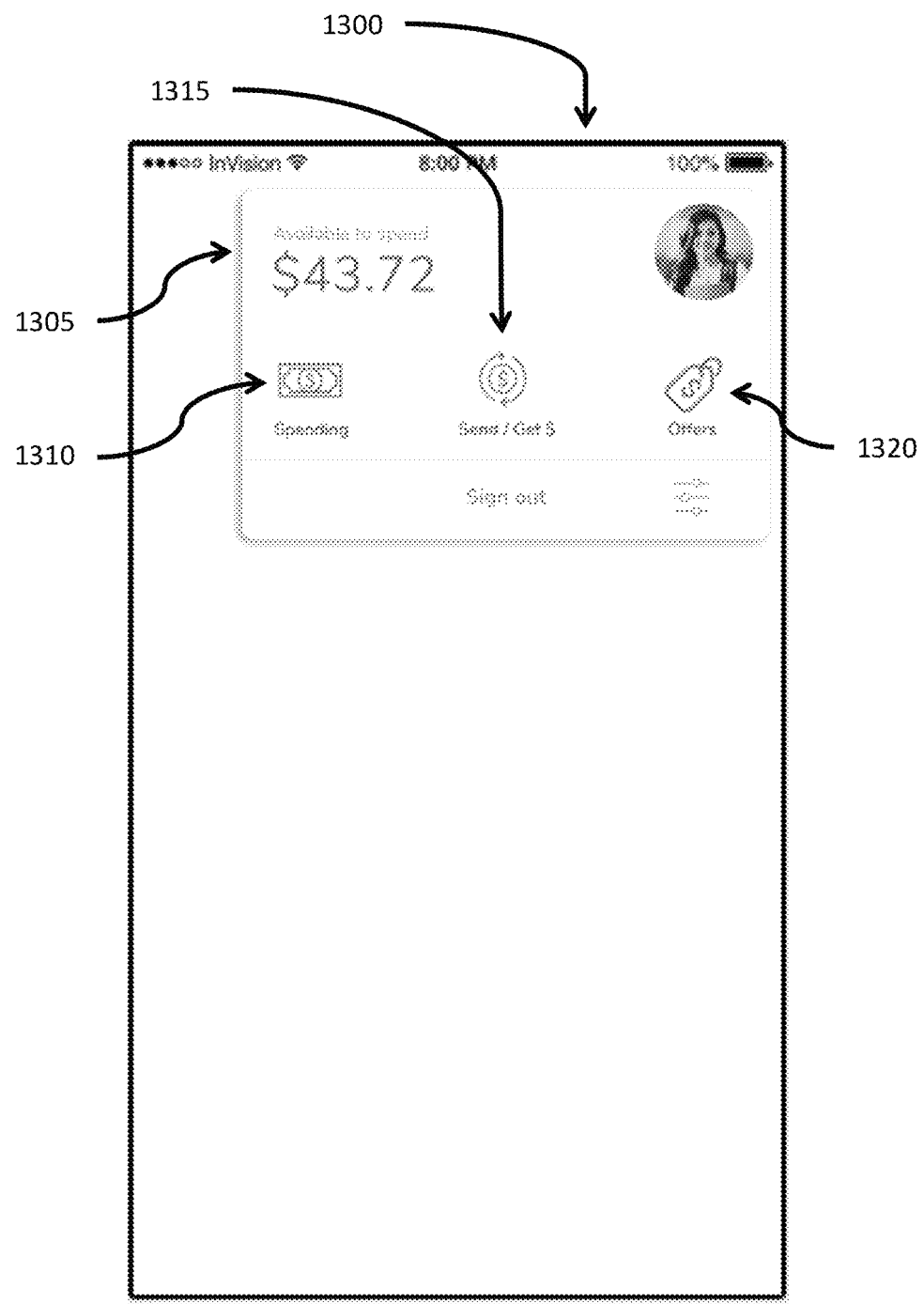
FIG. 13 is a graphical user interface providing one or more functionalities available starting at a first level of sophistication via an application running on a mobile computing device of a user, according to example embodiments.

In various implementations, the functionality discussed above, and illustrated in FIGS. 2-12, may be associated with a first level of sophistication (e.g., a "novice" or "beginner" level). Referring to FIG. 13, GUI 1300 includes a functionality access portion 1305 that presents a first set of perceptible elements corresponding with a first set of functionalities made available to the user who is at the first level of sophistication. In functionality access portion 1305, the provider application 112 may provide the user with the first set of functionalities by presenting the user with a first set of perceptible elements that include a spending icon 1310, a send/get icon 1315, or an offers icon 1320. In various implementations, to determine when an icon has been selected, the provider application 112 may detect a signal from the user computing device 110. In some implementations, the signal may be generated by the user computing device 110 when the user computing device 110 detects that a user has touched a portion of the touchscreen display. The signal from the user computing device 110 may indicate to the provider application 112 which portion of the screen has been touched, and the provider application 112 may identify which visually perceptible element was selected by determining which icon was displayed on the screen at the position corresponding with the portion of the screen at which the touch was detected by the user computing device 110.

In certain implementations, the perceptible elements are not visually perceptible elements such as icons on a display screen but, alternatively or additionally, elements perceptible in other ways, such as audible elements (e.g., as part of a verbal exchange between the user and the provider application 1120), haptic elements (e.g., involving vibrations of the user computing device), etc. In other implementations, the functionalities may be selected by the user in other ways, such as by having the user speak a voice command that is detected via a microphone incorporated in, or otherwise accessible to, the user computing device 110. The sounds captured by the microphone may be deciphered by the user computing device 110 (e.g., by a native application of the user computing device 110 or a module of the operating system of the user computing device 110), and the deciphered command provided to the provider application 112. Alternatively or additionally, the provider application 112 may itself decipher the voice command by analyzing sounds captured by the microphone. In some implementations, captured sounds may be transmitted to the financial institution computing system 120 for deciphering, and the deciphered voice commands transmitted back to the user computing device 110 so that the provider application 112 knows which functionalities are selected by the user.

In various implementations, in response to determining that the spending icon 1310 has been selected by the user, the provider application 112 may generate a GUI with information and elements similar or analogous to what is found in, for example, the transaction information portion 415 in GUI 400, transaction information portion 715 in GUI 700, transaction information portion 1115 in GUI 1000, and/or other perceptible elements and information related to how the user has spent or will be spending his or her money (and/or an identification of bills and user accounts to be used for expenses). In response to determining that the send/get icon 1310 has been selected by the user, the provider application 112 may generate a GUI with information and elements similar or analogous to what is found in, for example, the funds transfer portion 410 (in GUI 400), GUI 500, GUI 600, and/or other perceptible elements and information related to allowing the user to send or request funds with associated entities (and/or to identify associated entities if none has been previously identified). In response to determining that the offers icon 1315 has been selected by the user, the provider application 112 may generate a GUI with information and elements similar or analogous to what is found in, for example, offer details section 810, offer details section 1105, offer details section 1110, nearby offer icon 1115, GUI 1200, and/or other perceptible elements and information related to presenting a user with offers of potential interest and allowing the user to make purchases using his or her own funds and/or by splitting costs with associated entities (and if costs are to be split, to identify associated entities if none has been previously identified).

As discussed above, the provider application 112 (and/or the financial institution computing system 120) may determine that the user has reached a second or higher level of sophistication. In response to the determination, the provider application 112 may present the user with additional functionalities not previously made available to the user. In certain implementations, the new functionalities (or the executable code therefor) are retrieved or accessed via another computing system, such as the financial institution computing system 120 and/or one or more third party computing system 140 (e.g., a digital distribution platform). This may allow the application to save resources (e.g., memory for storage) that would otherwise be expended for unused features. In some implementations, the code for the new functionalities was already available at the user computing device 110 (as part of provider application 112), but was inaccessible ("locked") until it is "unlocked" by the user reaching the second level of sophistication. Locked features would be dormant such that computing resources are not used to, for example, execute the code corresponding to unused features (which may involve, e.g., sending or receiving data via the network circuit 118, and/or receiving inputs or presenting outputs via user input/output devices 116 such as a display screen, camera, and/or microphone, etc.).

Figure 14:
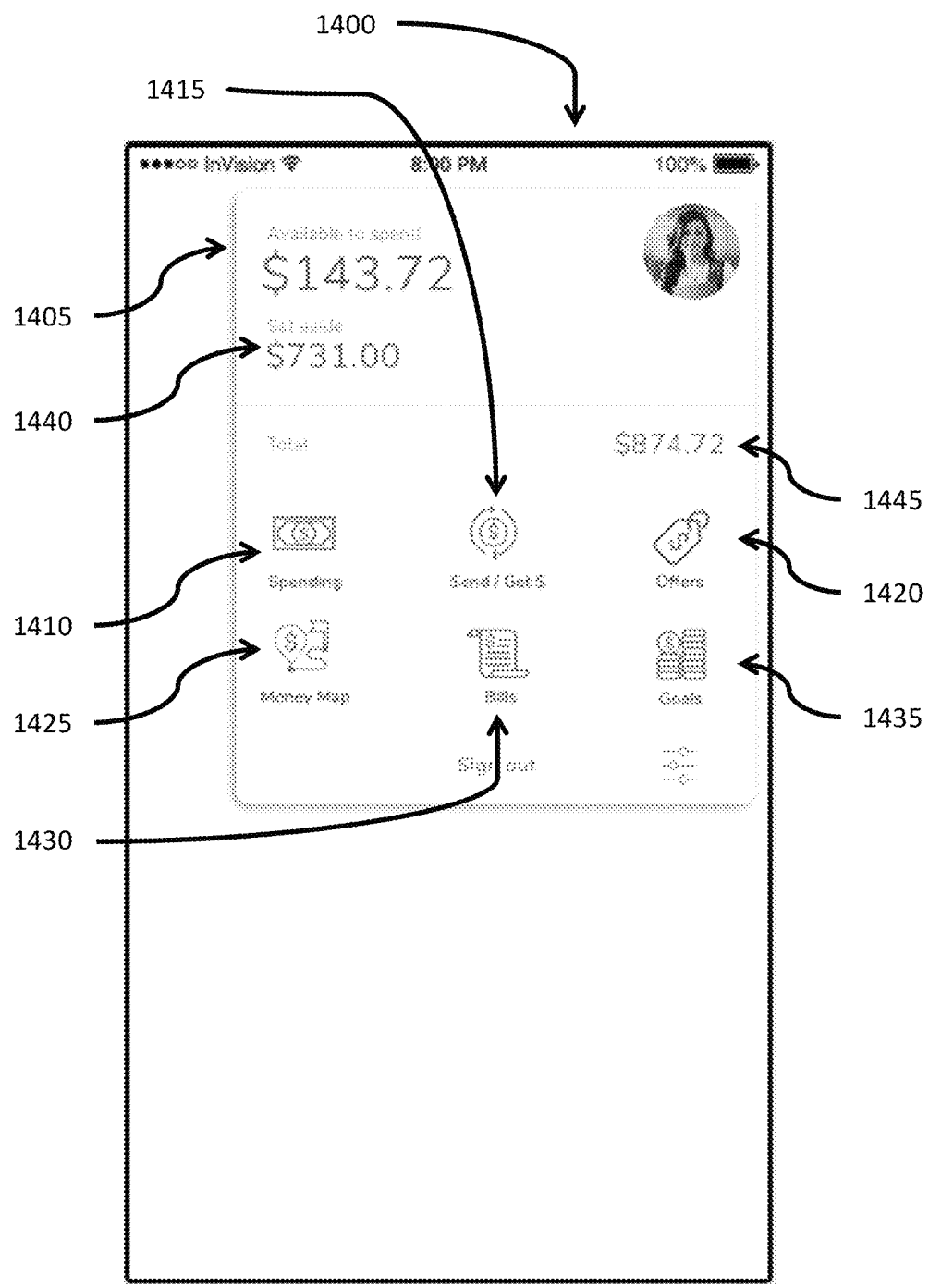
FIG. 14 is a graphical user interface presenting a second set of functionalities available starting at a second level of sophistication via an application running on a mobile computing device of a user, according to example embodiments.

The GUI 1400 illustrated in FIG. 14 provides a functionality access portion 1405 corresponding with a second set of functionalities made available to the user who is determined to be at a second or otherwise relatively higher level of sophistication. In functionality access portion 1405, the provider application 112 may allow the user to select from a second set of functionalities by presenting a second set of (visually) perceptible elements that include a spending icon 1410, a send/get icon 1415, and/or an offers icon 1420 (which are perceptible elements corresponding to functionalities also found in the first set of functionalities). The second set of perceptible elements may also provide additional (newly-available) functionalities by presenting such additional (visually) perceptible elements as a money map icon 1425, a bills icon 1430, and a goals icon 1435. The functionality access portion 1405 also provides for a new set aside amount 1440 (i.e., an allocation of funds to remain unspent so as to meet various financial goals or to be kept as a reserve in case of unexpected needs) and a total amount 1445 that computes the sum of funds that are available to spend and the funds set aside. Determining when an icon has been selected may be accomplished as discussed above with respect to GUI 1400. The provider application 112 increases the amount of information as well as the available functions so as to provide the user with useful information without overwhelming the user, and aims to help guide and educate the user so that the user becomes more financially informed and capable.

Figure 15:
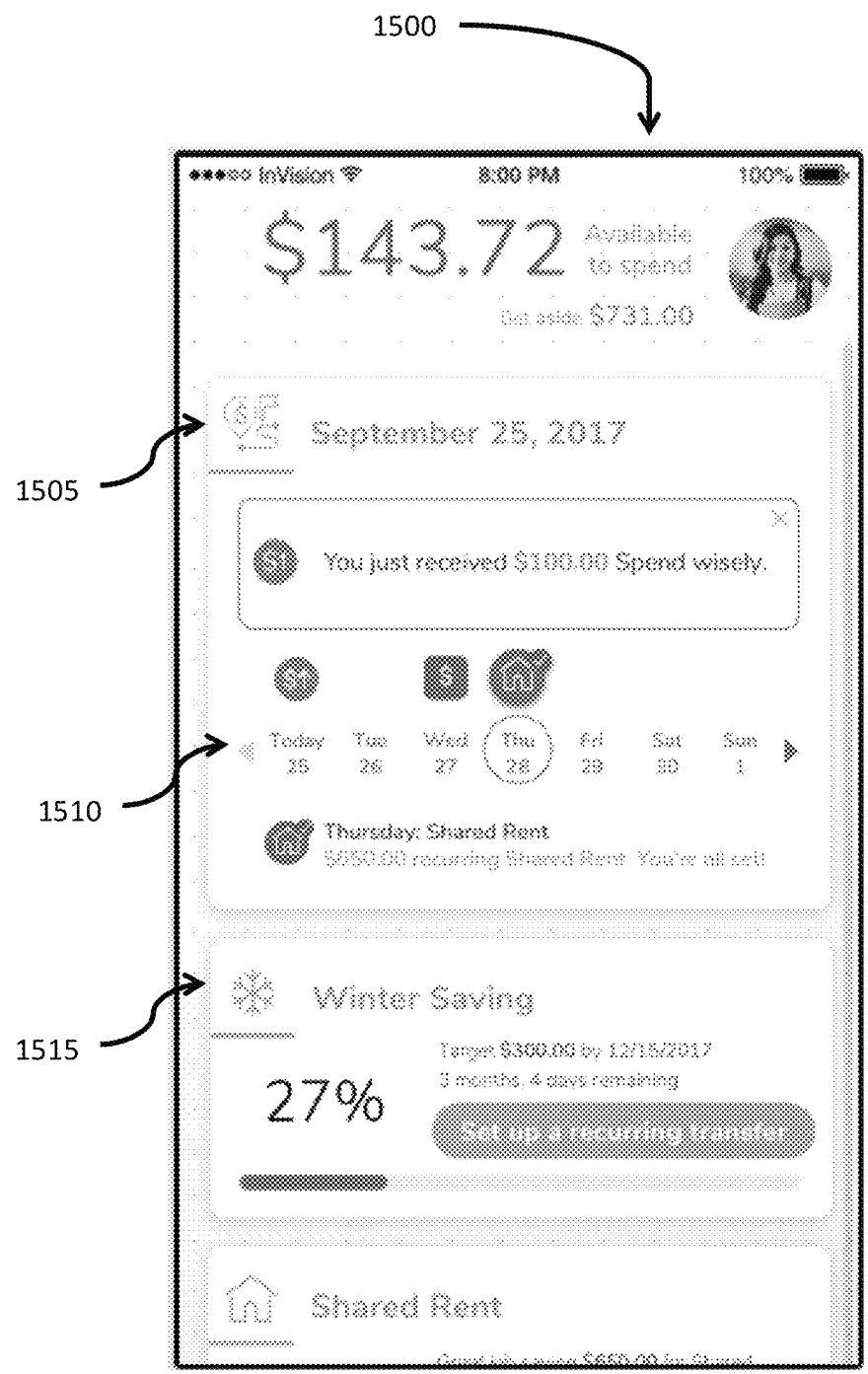
FIG. 15 is a graphical user interface providing one or more functionalities available starting at a second level of sophistication via an application running on a mobile computing device of a user, according to example embodiments.

FIG. 15 presents a GUI 1500 that provides certain content and functionality corresponding with the second level of sophistication that is unavailable at the first level of sophistication. GUI 1500 includes a money map 1505 that serves a forward-looking mapping of, for example, funds that will be received, bills that will be due, planned expenditures that will take place, etc. In some implementations, the money map includes a calendar. The money map 1505, as shown, has a time horizon 1510 of seven days, including "today." Such a time horizon (which need not be one week but instead may be, e.g., three days, two weeks, one month, etc.) is intended to help the user plan for the future without overwhelming him or her with the user's increasing financial responsibility. In some implementations, the time horizon is not the same for all users at the second level of sophistication, but rather may be variable. For example, provider application 112 may provide users with a time horizon that extends from "today" to an upcoming expenditure (e.g., rent due) or to an incoming funds transfer (e.g., a direct deposit from an employer). In certain implementations, provider application 112 may impose a minimum and/or a maximum time horizon for users based on the level of sophistication, such that, for example, users at the second level of sophistication may have a time horizon extending from three days to two weeks. In time horizon 1510 as shown in FIG. 15, Thursday the 28th is highlighted, below which the provider application 112 provides additional information on an upcoming transaction corresponding with the highlighted day. As shown, on the highlighted day a recurring rent of $650 is due (corresponding with the house icon), and a checkmark may indicate that a payment is scheduled and funds already set aside to cover the expense.

GUI 1500 also includes a proposed goal section 1515 with a recommendation intended to help the user achieve one or more financial goals. As shown, proposed goal section 1515 includes a recommendation to target saving $300 by Dec. 15, 2017. The provider application 112 allows the user to select an icon to set up a recurring transfer. Such transfers may be into other accounts (e.g., a savings or investment account) or into a virtual envelope that can allocate funds (and hold the funds in reserve) for specified purposes, with the allocated funds being subtracted from the amount that is available to spend.

Figure 16:
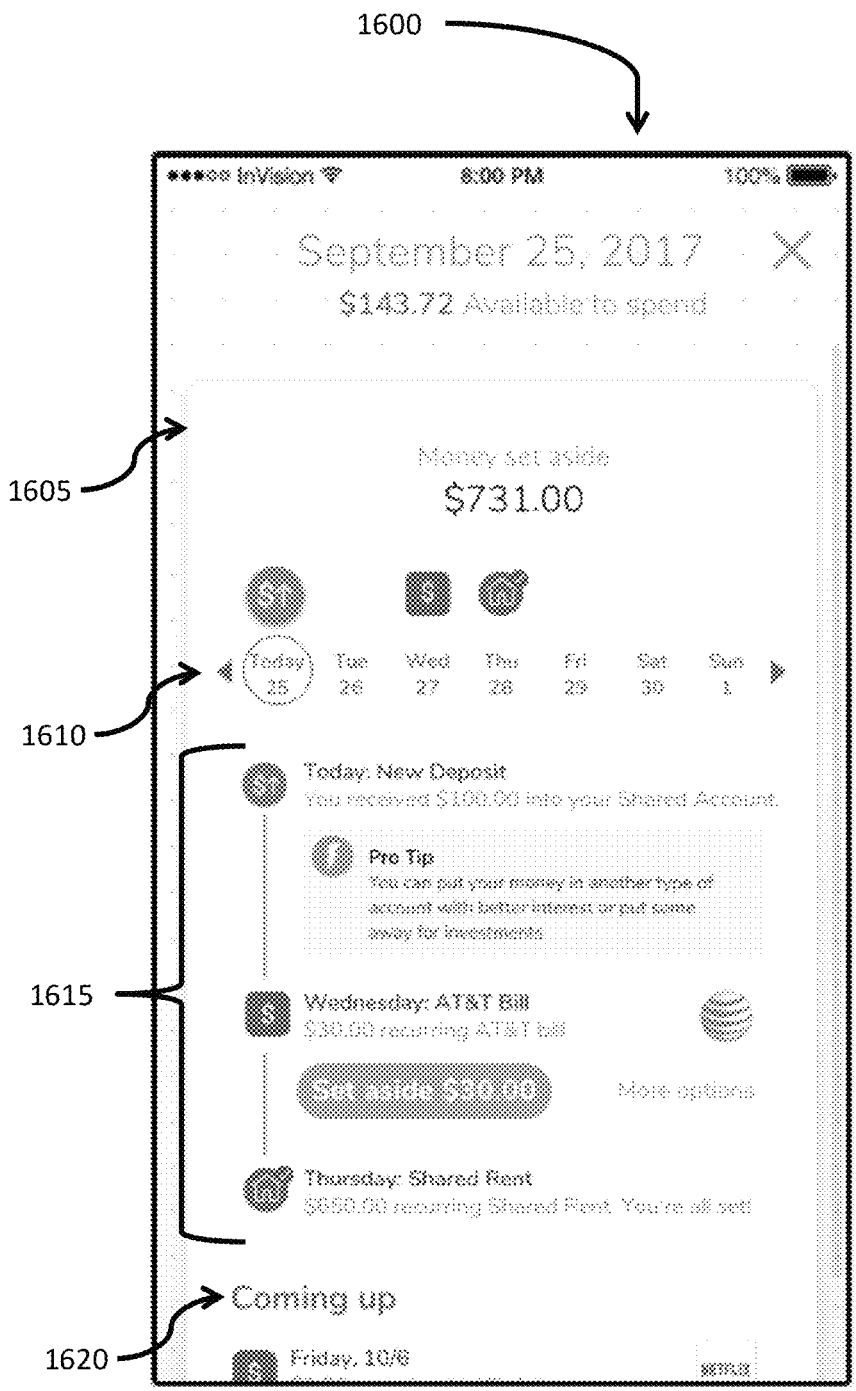
FIG. 16 is a graphical user interface providing one or more functionalities available starting at a second level of sophistication via an application running on a mobile computing device of a user, according to example embodiments.

In FIG. 16, a GUI 1600 includes a money map 1605 with a time horizon 1610 and an expanded timeline 1615 that presents, in chronological order, a set of financial events taking place during the corresponding time horizon 1610. The expanded timeline 1615 may be presented, for example, by the provider application 112 in response to a user input such as the user double-tapping the money map 1605, speaking the words "expand money map," or gesturing downwards on the touchscreen display (e.g., by touching the time horizon 1610 or somewhere else in the money map with a finger, and sliding the finger downwards). As shown, for example, the expanded timeline 1615 provides that today, a $100 deposit was received into a shared account, with a "Pro Tip" proposing that the money could be put into another type of account to earn more interest or could be invested. The expanded timeline 1615 also includes a phone bill due on Wednesday the 27th, and a rent payment due on Thursday the 28th. The money map 1605 may also, in some implementations, include a preview section 1620 ("Coming up") with one or more upcoming financial events to help the user plan ahead. The preview section 1620 may, in certain implementations, be limited to certain events, such as bills not yet scheduled for payment. The preview section 1620 may also be limited to a certain amount of time beyond the time horizon, such as three days, one week, or one month. It may, in some implementations, include anticipated or predicted but unconfirmed financial events that may or may not fall within the time horizon, such as requested monies not yet received (but could be received at any time within or beyond the time horizon).

Figure 17:
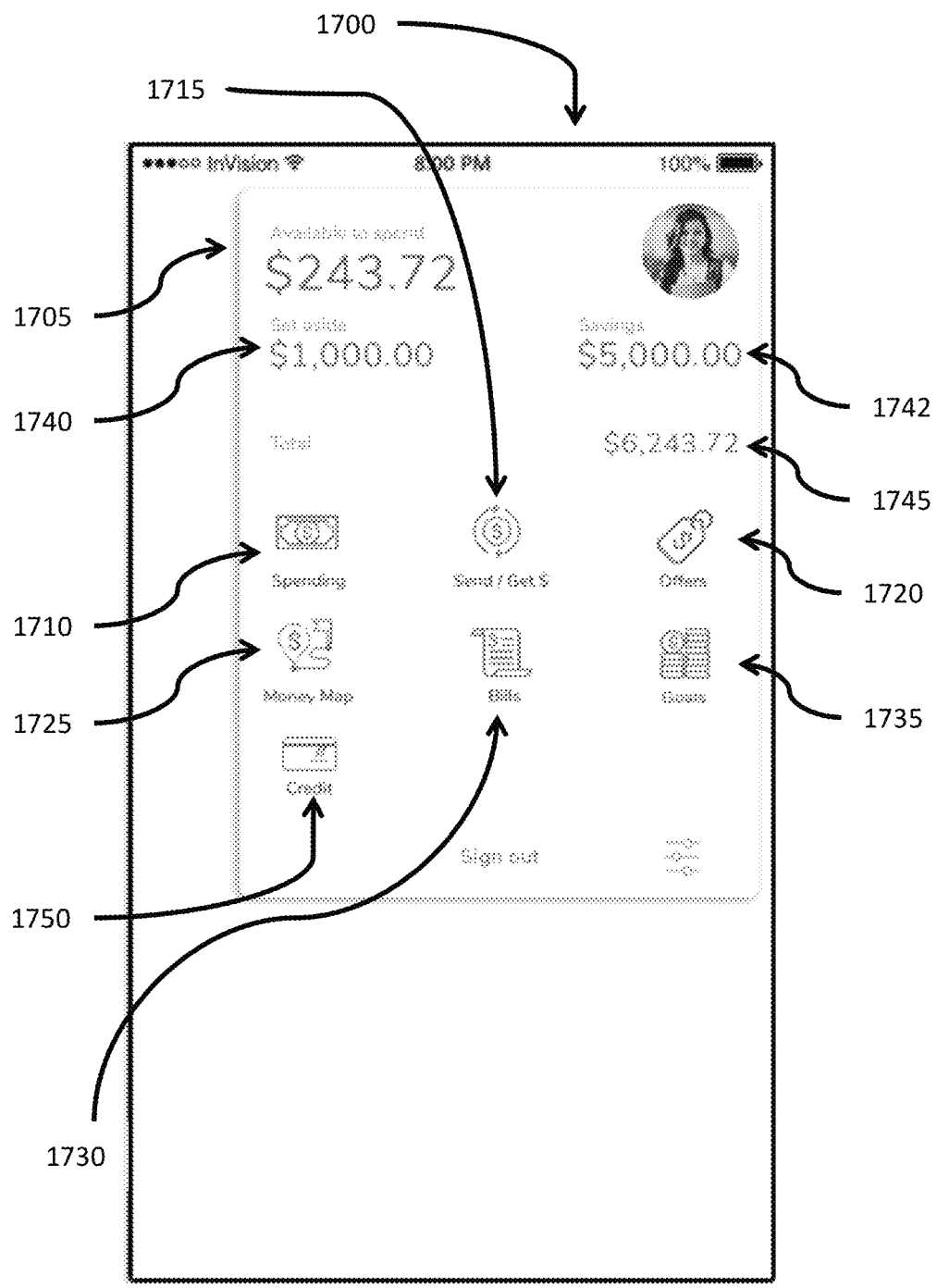
FIG. 17 is a graphical user interface presenting a third set of functionalities available starting at a third level of sophistication via an application running on a mobile computing device of a user, according to example embodiments.

The GUI 1700 illustrated in FIG. 17 provides a functionality access portion 1705 corresponding with a third set of functionalities made available to a user who is determined to be at a third or otherwise relatively higher level of sophistication that is higher than both the first and second levels of sophistication. In functionality access portion 1705, the provider application 112 may allow the user to select from a third set of functionalities by presenting a third set of visually perceptible elements that include a spending icon 1710, a send/get icon 1715, an offers icon 1720, a money map icon 1725, a bills icon 1730, and a goals icon 1735 (which are perceptible elements corresponding to functionalities also found in the second set of functionalities). The third set of perceptible elements may also provide additional functionalities by presenting such additional visually perceptible elements as a credit icon 1750. The functionality access portion 1705 also provides for a set aside amount 1740, a savings amount 1742, and a total amount 1745 that sums funds that are available to spend with funds that are set aside funds and funds in savings. Determining when an icon has been selected may be accomplished as discussed above with respect to GUIs 1300 and 1400. The provider application 112 increases the amount of information as well as the available functions so as to provide the user with useful content without overwhelming the user, and aims to help guide and educate the user so that the user becomes more financially informed and capable.

Figure 18:
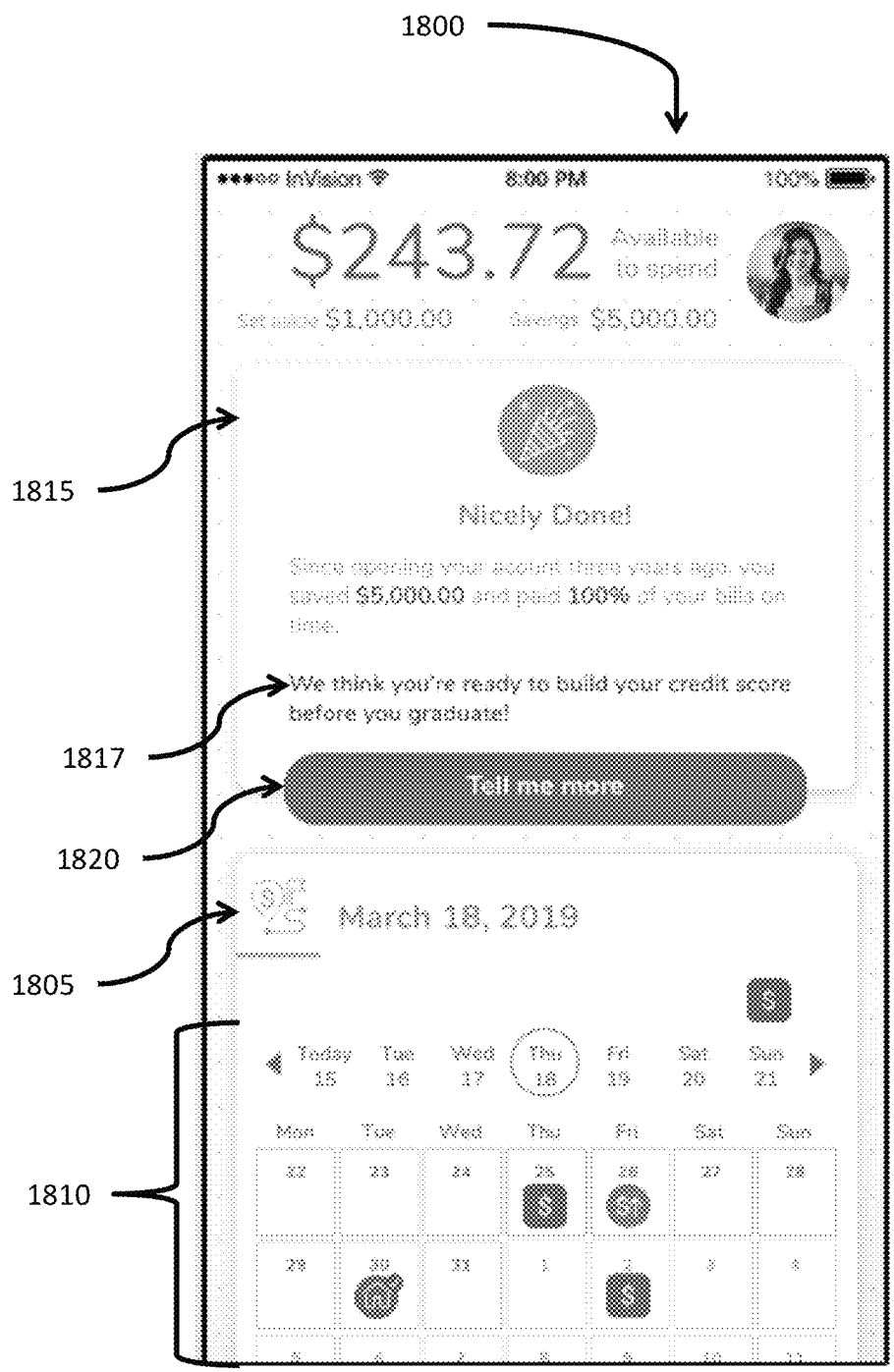
FIG. 18 is a graphical user interface providing one or more functionalities available starting at a third level of sophistication via an application running on a mobile computing device of a user, according to example embodiments.

FIG. 18 provides an example GUI 1800 corresponding with the third level of sophistication. GUI 1800 includes a money map 1805 which, like the money map 1505, provides a forward-looking mapping of financial events (e.g., funds that will be received, bills that will be due, planned expenditures that will take place, etc.). The money map 1805, as shown, has a time horizon 1810 of several weeks or a month (more fully viewable by scrolling the page). The time horizon 1810 of the third level is greater than the time horizon 1510 of the second level because a user at the third level of sophistication is predicted to need, to be more comfortable with, and/or to be more accustomed to planning further into the future without feeling overwhelmed by the increased financial information and/or responsibility. As with the time horizon corresponding with the second level of sophistication, the time horizon corresponding with the third level of sophistication need not be the same for all users at the third level of sophistication, but rather may be variable. In time horizon 1810 as shown in FIG. 18, bills are due on Sunday the 21st, Thursday the 25th, and Friday the 2nd (as indicated by the rectangular icon with a dollar sign), a deposit is scheduled or anticipated on Friday the 26th (as indicated by the circle with a dollar sign and an upwards-pointing arrow), and the user's rent is due on Tuesday the 30th (as indicated by the image of a home in a circle).

GUI 1800 also includes a goal progress section 1815 informing the user that he or she has accomplished a goal (i.e., saving a specified amount of money and paying all bills on time). In some implementations, progressing to the third level of sophistication may be based at least in part on achieving such a goal, and such a congratulatory tile may be one of the introductory tiles presented by the provider application 112 when a user first reaches a new, higher level of sophistication. In some implementations, a goal may be used by the provider application 112 and/or the financial institution computing system 120 to determine readiness of a user to proceed to a new, higher level of sophistication. In some implementations, one or more goals may be set by the provider application 112. In certain implementations, goals set by the provider application 112 may be customizable by the user. For example, the provider application 112 may establish a savings goal, potentially with a proposed amount to be saved, but allow the user to set or modify the specific amount and/or timeline, or to select the specific amount and/or timeline within specified ranges (determined by the application 112 and/or the financial institution computing system 120 to be appropriate for the user based on, e.g., the user's level of sophistication and/or on the user's circumstances). Accomplishing certain goals (whether set by application 112 and/or by financial institution computing system 120) may be deemed by the provider application 112 to warrant a change to a higher level of sophistication. The goal progress section 1815 also includes a message 1817 about building a credit score. Because the user is able to quantify the amount of money saved (as shown, $5,000), a time period over which bills were paid on time (as shown, three years), and an amount of available funds taking into account upcoming expenses, the user may feel more confident in/trusting of the proposals presented by the provider application 112, so as to more seriously consider applying for a credit card to build a credit history.

Figure 19:
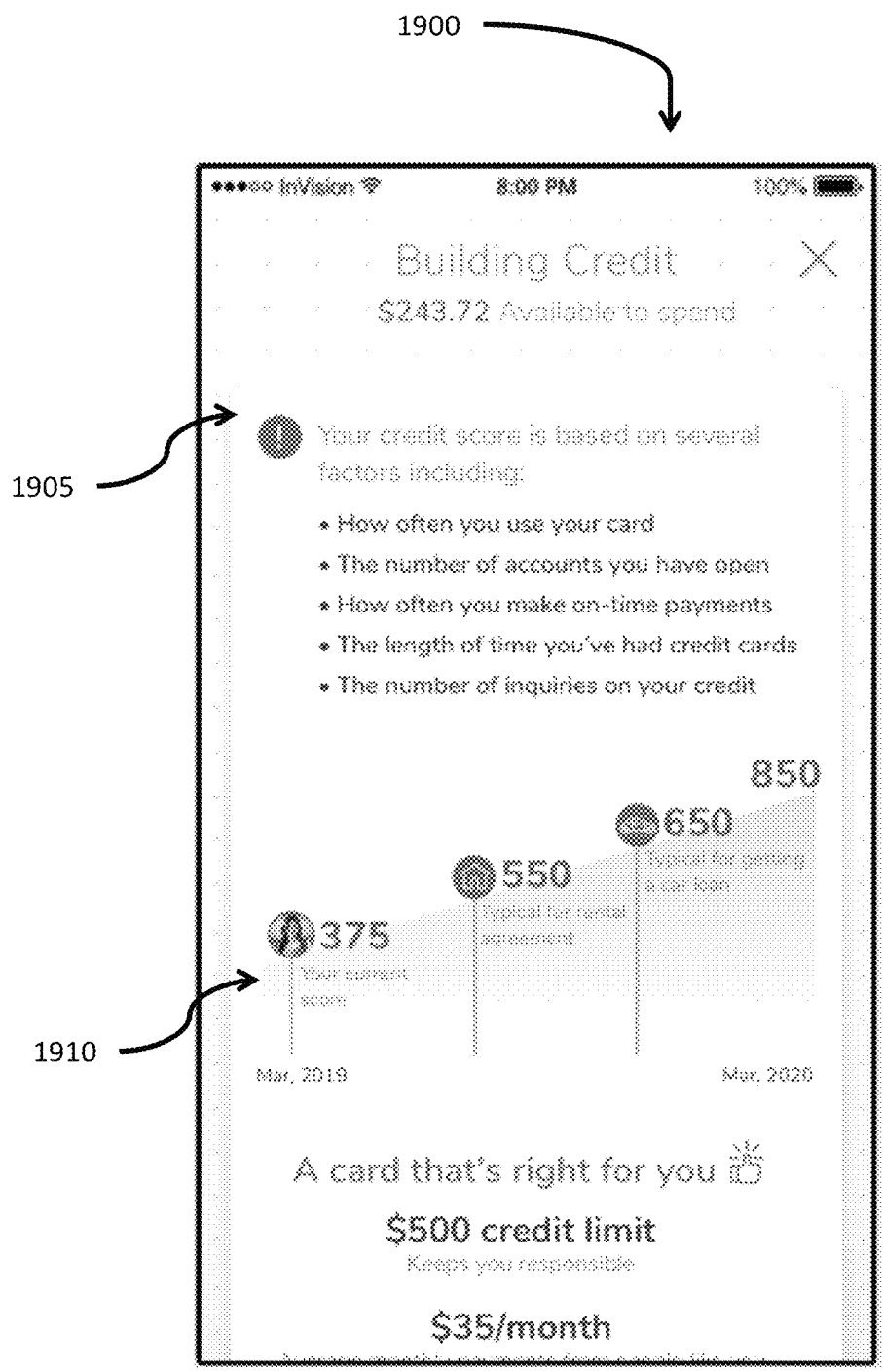
FIG. 19 is a graphical user interface providing one or more functionalities available starting at a third level of sophistication via an application running on a mobile computing device of a user, according to example embodiments.

Provider application 112 may present additional information on building credit via an interface such as GUI 1900 depicted in FIG. 19. In GUI 1900, provider application 112 presents an information portion 1905 with information on what influences a credit score and what credit scores tend to be required for such activities as getting a loan in educational portion 1905. GUI 1900 also provides an anticipated timeline 1910 for achieving certain credit scores based on the financial habits of the user, such as achieving a certain score by a certain date (as shown, March 2020). The provider application 112, also based on the financial behavior of the user, proposes a certain credit limit (as shown, a $500 credit limit) that is determined to be manageable based on the user's finances, and related information such as minimum monthly payments required for such a credit limit. Provider application 112 may then allow the user to review contractual terms and electronically sign to apply for and open a new credit account with the financial institution associated with the financial institution computing system 120. In some implementations, the provider application 112 may make the credit card, upon approval, available to use immediately or shortly thereafter. The provider application 112 may add the credit card to a digital wallet of the user by selecting an appropriate icon or responding to another perceptible element (such as a voice prompt). In some implementations, the mobile wallet may accessible via a client application 114 of a third party, such as Android Pay™ or Apple Pay™, in which case the provider application 112 may provide the relevant information to the appropriate mobile wallet application (which may or may not be running on the same user computing device 110 running the provider application 112). In certain implementations, the provider application 112 may communicate with a mobile wallet computing system 130 (which may be administered by the financial institution associated with the financial institution computing system 120, or by an entity that is a third party with respect to the financial institution) to provide the information needed to use the newly-opened credit card for transactions.

Figure 20:
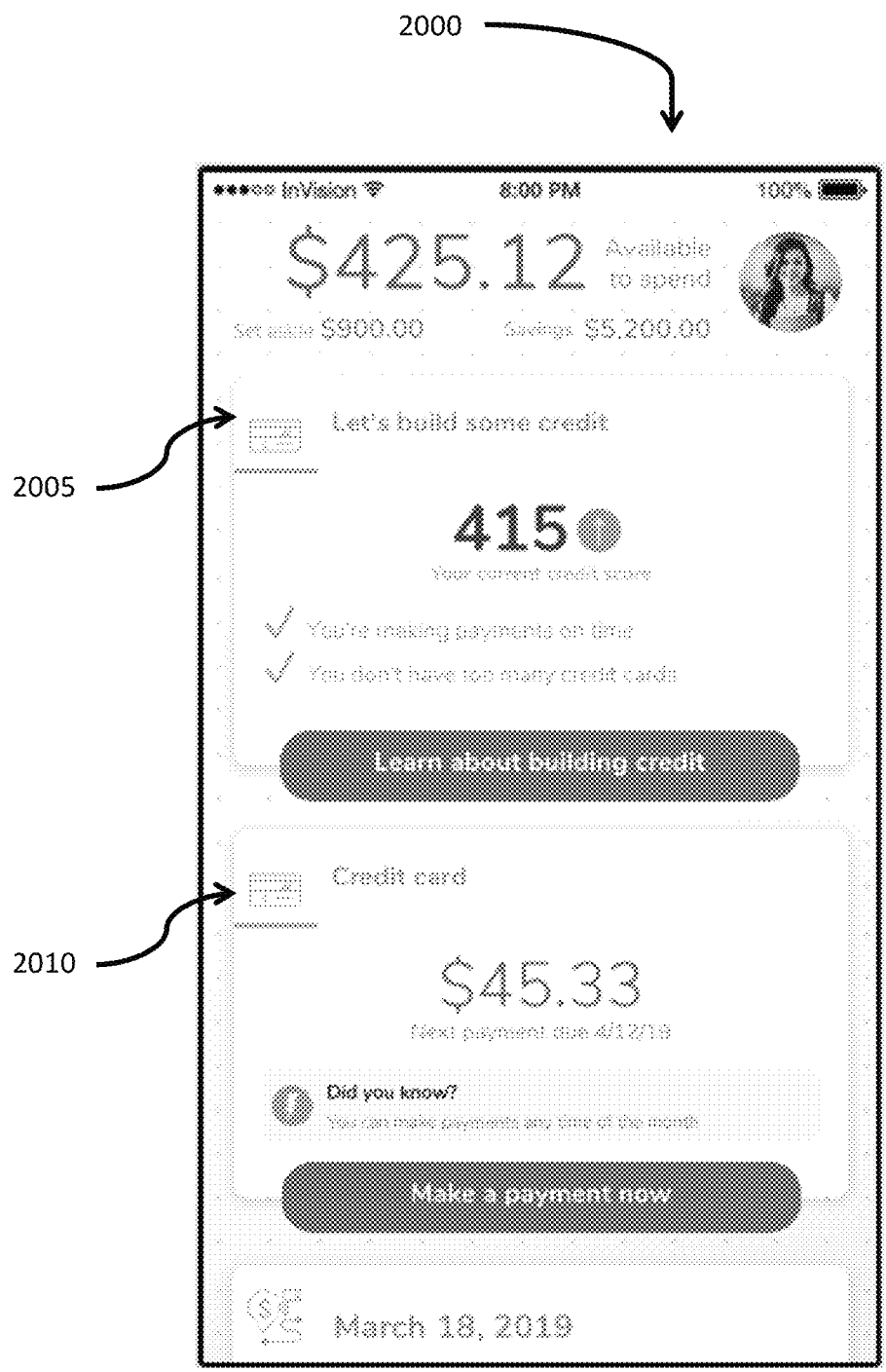
FIG. 20 is a graphical user interface providing one or more functionalities available starting at a third level of sophistication via an application running on a mobile computing device of a user, according to example embodiments.

With the new credit account established, the provider application 112 may present an interface such as GUI 2000 in FIG. 20. In GUI 2000, the provider application 112 may present a credit goal section 2005, with the user's credit score, whether the user's credit score is trending up or down, and factors affecting the user's credit score. In a bill section 2010, the provider application 112 may inform the user of an amount for a credit card and due date for an upcoming payment to the credit card.

In various implementations, the provider application 112 generates GUIs in response to selection of the functionality icons (e.g., such as the icons shown in FIGS. 13, 14, and 17) by selecting appropriate "tiles" with requested content and/or functionality from a tile "repository." For example, the provider application 112 may select one or more transaction information tiles to present the user with information on his or her transactions and spending behaviors. Similarly, the provider application 112 may select a tile that allows the user to select an associated entity, and/or a tile that allows the user to select between sending money or sending a request for money to the selected associated entity. And the provider application 112 may present separate tiles with identified offers that are tailored to the anticipated needs of the user. Example tiles in the figures include funds transfer portion 410, transaction information portion 415, funds transfer portion 710, transaction information portion 715, offer details section 810, payment scheme section 840, transaction information portion 1015, offer detail section 1105, offer detail section 1110, functionality access portion 1305, functionality access portion 1405, money map 1505, proposed goal section 1515, money map 1605, functionality access portion 1705, goal progress section 1815, credit goal section 2005, a bill section 2010

In various implementations, a user may be moved down in level of sophistication by the provider application 112 (and/or the financial institution computing system 120) based on certain behaviors or other information that becomes available. For example, if the user is regularly late in paying bills and is unable to budget effectively for a particular time horizon corresponding with a level of sophistication, the provider application 112 may revert the user do a lower level of sophistication temporarily or indefinitely.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A mobile computing device of a user, the mobile computing device comprising (i) a network interface configured to communicate, via a telecommunications network, with a banking computing system of a bank to access financial account data corresponding to a bank account of the user, (ii) one or more user interfaces configured to display perceptible graphical user interfaces with selectable icons providing banking functionalities, and to receive user inputs via selections by the user of icons presented by the graphical user interfaces, and (iii) a processor and a memory having stored thereon instructions which, when executed by the processor, cause the processor to run a mobile banking application configured to:

determine, via at least one of the network interface and the one or more user interfaces, that the user is at a first level of financial sophistication based on a plurality of criteria, wherein the plurality of criteria comprises a first series of user financial transactions and user behaviors including (i) timeliness of bill payments, (ii) living situation, (iii) financial independence, and (iv) student status, wherein determining that the user is at the first level of financial sophistication comprises:
  determining a respective weight value of each criterion of the first plurality of criteria based at least on the first series of user financial transactions and a respective weight range associated with the criterion;
  generating a sophistication score for the user by summing the respective weight value for each criterion of the first plurality of criteria; and
  comparing the sophistication score to a threshold associated with the first level of financial sophistication;
present, via the one or more user interfaces, a first graphical user interface including:
  a first selectable icon which, when selected via the one or more user interfaces, provides a first banking functionality; and
  a second selectable icon which, when selected via the one or more user interfaces, provides a second banking functionality;
determine, via at least one of the network interface and the one or more user interfaces, that the user is at a second level of financial sophistication based at least in part on a second series of user financial transactions and user behaviors; and
in response to determining that the user is at the second level of financial sophistication, provide additional banking functionality, by presenting, via the one or more user interfaces, a second graphical user interface including a third selectable icon which, when selected via the one or more user interfaces, provides a third banking functionality not provided via the first graphical user interface.

2. The mobile computing device of claim 1, wherein the mobile banking application is configured to determine that the user is at the second level of financial sophistication via the banking computing system.

3. The mobile computing device of claim 1, wherein the mobile banking application is further configured to determine that the user is at the second level of financial sophistication based on how the user uses the first and second banking functionalities via the first graphical user interface.

4. The mobile computing device of claim 1, wherein the mobile banking application is further configured to determine that the user is at the second level of financial sophistication based at least in part on the user achieving a financial goal.

5. The mobile computing device of claim 1, wherein the mobile banking application is further configured to determine that the user is at the second level of financial sophistication based on transactions involving the bank account administered by the banking computing system.

6. The mobile computing device of claim 1, wherein the second banking functionality comprises a graphical mapping of fund distribution for a first time horizon, and wherein the third banking functionality comprises a graphical mapping of fund distribution for a second time horizon different from the first time horizon.

7. The mobile computing device of claim 1, wherein the mobile banking application is further configured to:
  detect a trigger; and
  in response to detecting the trigger, determine whether the user has advanced to the second level of financial sophistication and should be provided with the additional banking functionality.

8. The mobile computing device of claim 7, wherein the trigger is passage of a predetermined amount of time.

9. The mobile computing device of claim 1, wherein the plurality of criteria is a first plurality of criteria, wherein the threshold is a first threshold, wherein the sophistication score is a first sophistication score, wherein the second series of user financial transactions and user behaviors occurs after the determination that the user is at the first level of financial sophistication, and wherein determining that the user is at the second level of financial sophistication comprises:
  determining a respective weight value of each criterion of a second plurality of criteria based at least on the second series of user financial transactions and a respective weight range associated with the criterion;
  generating a second sophistication score for the user by summing the respective weight value for each criterion of the second plurality of criteria; and
  comparing the second sophistication score to a second threshold associated with the second level of financial sophistication.

10. The mobile computing device of claim 9, wherein the second series of user financial transactions and user behaviors includes at least one of (i) timeliness of bill payments, (ii) living situation, (iii) financial independence, and (iv) student status.

11. A banking computing system of a bank, the banking computing system comprising (i) a network interface configured to communicate with a mobile computing device of a user via a telecommunications network, the user having a bank account at the bank, and (ii) a processor and a memory having stored thereon executable code which, when executed by the processor, causes the processor to:
  determine that the user is at a first level of financial sophistication based at least in part on a plurality of criteria, wherein the plurality of criteria comprises a first series of user financial transactions and user behaviors including (i) timeliness of bill payments, (ii) living situation, (iii) financial independence, and (iv) student status, wherein determining that the user is at the first level of financial sophistication comprises:
    determining a respective weight value of each criterion of the first plurality of criteria based at least on the first series of user financial transactions and a respective weight range associated with the criterion;
    generating a sophistication score for the user by summing the respective weight values for each criterion of the first plurality of criteria; and
    comparing the sophistication score to a threshold associated with the first level of financial sophistication;
  transmit a first instruction to the mobile computing device to cause a mobile banking application running on the mobile computing device to present a first graphical user interface via one or more user interfaces of the mobile computing device, the first graphical user interface including:
    a first selectable icon which, when selected via the one or more user interfaces, provides a first banking functionality; and
    a second selectable icon which, when selected via the one or more user interfaces, provides a second banking functionality;
  determine that additional banking functionality is to be provided to the user for reaching a second level of financial sophistication based at least in part on a second series of user financial transactions and user behaviors;
  in response to determining that the additional banking functionality is to be provided to the user, transmit a second instruction to the mobile computing device to cause the mobile banking application to present, via the one or more user interfaces, a second graphical user interface including a third selectable icon which, when selected via the one or more user interfaces, provides a third banking functionality not provided via the first graphical user interface.

12. The banking computing system of claim 11, wherein the code further causes the processor to determine that the additional banking functionality is to be provided based at least in part on how the first and second banking functionalities provided via the first graphical user interface are used by the user.

13. The banking computing system of claim 11, wherein the second graphical user interface further includes:
  the first selectable icon which, when selected via the one or more user interfaces, provides the first banking functionality; and
  the second selectable icon which, when selected via the one or more user interfaces, provides the second banking functionality.

14. The banking computing system of claim 11, wherein the code further causes the processor to determine that the additional banking functionality is to be provided based at least in part on the user achieving a financial goal.

15. The banking computing system of claim 9, wherein the code further causes the processor to:
  detect a trigger; and
  in response to detecting the trigger, determine whether the user has advanced to the second level of financial sophistication and should be provided with the additional banking functionality.

16. The banking computing system of claim 15, wherein the trigger is passage of a predetermined amount of time.

17. The banking computing device of claim 13, wherein the second banking functionality comprises a graphical mapping of fund distribution for a first time horizon, and wherein the third banking functionality comprises a graphical mapping of fund distribution for a second time horizon different from the first time horizon.

18. A computer-implemented method comprising:
  determining, by a mobile banking application running on a mobile computing device of a user with a bank account at a bank, the mobile computing device being configured to communicate via a telecommunications network with a banking computing system of the bank, that the user is at a first level of financial sophistication based at least in part on a plurality of criteria, wherein the plurality of criteria comprises a first series of user financial transactions and user behaviors including (i) timeliness of bill payments, (ii) living situation, (iii) financial independence, and (iv) student status, wherein each criterion of the first plurality of criteria comprises a respective weight, and wherein determining that the user is at the first level of financial sophistication comprises:

determining a respective weight value of each criterion of the plurality of criteria based at least on the first series of user financial transactions and a respective weight range associated with the criterion;

generating a sophistication score for the user by summing the respective weight value for each criterion of the first plurality of criteria; and comparing the sophistication score to a threshold associated with the first level of financial sophistication;

presenting, by the mobile banking application via one or more user interfaces of the mobile computing device, the one or more user interfaces configured to receive user inputs and present perceptible graphical user interfaces, a first graphical user interface including:

a first selectable icon which, when selected via the one or more user interfaces, provides a first banking functionality through communication between the mobile computing device and the banking computing system; and a second selectable icon which, when selected via the one or more user interfaces, provides a second banking functionality through communication between the mobile computing device and the banking computing system;

determining, by the mobile banking application, that the user is at a second level of financial sophistication based at least in part on a second series of user financial transactions and user behaviors; and in response to determining that the user is at the second level of financial sophistication, presenting, by the mobile banking application via the one or more user interfaces of the mobile computing device, a second graphical user interface including a third selectable icon which, when selected via the one or more user interfaces, provides a third banking functionality not provided via selection of one or both of the first and second selectable icons, wherein the first graphical user interface does not include the third selectable icon providing the third banking functionality.

19. The method of claim 18, wherein determining that the user is at the second level of financial sophistication comprises receiving, via a network interface of the mobile computing device configured to communicate via the telecommunications network with the banking computing system that administers the bank account, an indication from the banking a computing system that additional banking functionality is to be provided.

20. The method of claim 15, wherein determining that the user is at the second level of financial sophistication comprises evaluating, by the mobile banking application, how the first and second banking functionalities provided via the first graphical user interface are used by the user.

* * * * *